United States Patent
Kurakake

(10) Patent No.: US 11,820,459 B2
(45) Date of Patent: Nov. 21, 2023

(54) LEANING VEHICLE

(71) Applicant: YAMAHA HATSUDOKI KABUSHIKI KAISHA, Iwata (JP)

(72) Inventor: Haruhito Kurakake, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 257 days.

(21) Appl. No.: 17/334,548

(22) Filed: May 28, 2021

(65) Prior Publication Data

US 2021/0284272 A1  Sep. 16, 2021

Related U.S. Application Data

(63) Continuation-in-part of application No. PCT/JP2019/046877, filed on Nov. 29, 2019.

(30) Foreign Application Priority Data

Nov. 29, 2018 (JP) .................... 2018-224261

(51) Int. Cl.
*B62K 5/10* (2013.01)
*B62J 25/06* (2020.01)
(Continued)

(52) U.S. Cl.
CPC .............. *B62K 5/10* (2013.01); *B62J 25/06* (2020.02); *B62K 5/05* (2013.01); *B62K 25/00* (2013.01); *B62L 3/00* (2013.01)

(58) Field of Classification Search
CPC ... B62K 5/10; B62K 5/05; B62K 25/00; B62J 25/06; B62L 3/00; B62L 3/02
See application file for complete search history.

(56) References Cited

U.S. PATENT DOCUMENTS

| 7,226,062 B1 | 6/2007 | Stefano |
| 7,648,148 B1 | 1/2010 | Mercier |
(Continued)

FOREIGN PATENT DOCUMENTS

| CN | 104507790 A | 4/2015 |
| CN | 104703870 A | 6/2015 |
(Continued)

OTHER PUBLICATIONS

"Tritown", Yamaha Hatsudoki Kabushiki Kaisha, [searched on Oct. 1, 2018], Internet, https://global.yamaha-motor.com/jp/design_technology/design/concept/tritown/.

*Primary Examiner* — Minnah L Seoh
*Assistant Examiner* — Ryan Edward Hardy
(74) *Attorney, Agent, or Firm* — Rabin & Berdo, P.C.

(57) ABSTRACT

A leaning vehicle including a braking mechanism, a linkage mechanism configured to cause a body frame of the leaning vehicle to lean leftward or rightward, a lean lock mechanism configured to restrict leftward leaning and rightward leaning of the vehicle body frame, and an interlocking mechanism configured to actuate the braking mechanism and the lean lock mechanism. The interlocking mechanism includes an operation input section configured to input a first operating force, a brake-operation-input section configured to input a second operating force, an operating force distributor configured to distribute the first operating force input by the operation input section to the lean lock mechanism and the braking mechanism, and a brake actuator configured to actuate the braking mechanism by the first operating force distributed to the braking mechanism by the operating force distributor, or by the second operating force input by the brake-operation-input section.

5 Claims, 15 Drawing Sheets

(51) Int. Cl.
    *B62K 5/05*         (2013.01)
    *B62K 25/00*       (2006.01)
    *B62L 3/00*         (2006.01)

(56) References Cited

U.S. PATENT DOCUMENTS

| | | | |
|---|---|---|---|
| 8,070,172 B1 | 12/2011 | Smith | |
| 9,744,952 B2 * | 8/2017 | Seto | B62K 5/05 |
| 9,873,474 B2 | 1/2018 | Ohno et al. | |
| 2010/0044977 A1 | 2/2010 | Hughes | |
| 2012/0181765 A1 | 7/2012 | Hill | |
| 2014/0375015 A1 * | 12/2014 | Yu | B62K 5/05 |
| | | | 280/267 |
| 2015/0246704 A1 * | 9/2015 | Takano | B60G 3/01 |
| | | | 280/269 |
| 2016/0318581 A1 | 11/2016 | Kim et al. | |
| 2017/0088222 A1 | 3/2017 | Ohno et al. | |
| 2017/0144719 A1 * | 5/2017 | Terada | B62K 5/05 |
| 2017/0210440 A1 | 7/2017 | Dragomir | |
| 2018/0178870 A1 | 6/2018 | Takeshita et al. | |
| 2018/0264906 A1 | 9/2018 | Hara et al. | |
| 2018/0265117 A1 | 9/2018 | Hara et al. | |
| 2018/0281543 A1 * | 10/2018 | Mori | B62K 5/10 |
| 2019/0047550 A1 | 2/2019 | Miki | |
| 2019/0118894 A1 | 4/2019 | Hirakawa et al. | |
| 2019/0210683 A1 | 7/2019 | Lin | |
| 2022/0204112 A1 | 6/2022 | Sun et al. | |
| 2022/0306233 A1 | 9/2022 | Chee | |

FOREIGN PATENT DOCUMENTS

| | | | |
|---|---|---|---|
| CN | 108502077 A | 9/2018 | |
| EP | 2998209 A1 | 3/2016 | |
| EP | 3150476 A1 | 4/2017 | |
| EP | 3153392 A1 * | 4/2017 | ............... B60T 8/00 |
| EP | 3153392 A1 | 4/2017 | |
| EP | 3184409 A2 | 6/2017 | |
| EP | 3871966 A4 | 12/2021 | |
| JP | S5948282 A | 3/1984 | |
| JP | S59179466 A | 10/1984 | |
| JP | 2006256401 A | 9/2006 | |
| JP | 2007159776 A | 6/2007 | |
| JP | 2015120360 A | 7/2015 | |
| JP | 2016060470 A | 4/2016 | |
| JP | 2016060471 A | 4/2016 | |
| JP | 2017065527 A | 4/2017 | |
| JP | 2017094906 A | 6/2017 | |
| JP | 2017165147 A | 9/2017 | |
| JP | 2018030516 A | 3/2018 | |
| TW | 201834911 A | 10/2018 | |
| WO | WO-2005075278 A1 * | 8/2005 | ............... B62D 9/02 |
| WO | WO-2009059099 A2 * | 5/2009 | ............ B60G 11/16 |
| WO | 2014046282 A1 | 3/2014 | |
| WO | WO-2014046282 A1 * | 3/2014 | ........... B60G 17/005 |
| WO | WO-2017086351 A1 * | 5/2017 | ........... B60G 17/015 |
| WO | 2017208992 A1 | 12/2017 | |
| WO | WO-2018211973 A1 * | 11/2018 | ............... B62D 5/04 |
| WO | 2020111261 A1 | 6/2020 | |

\* cited by examiner

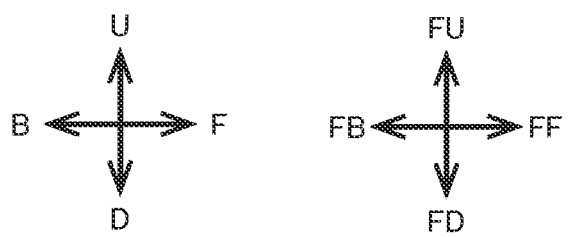
FIG. 9
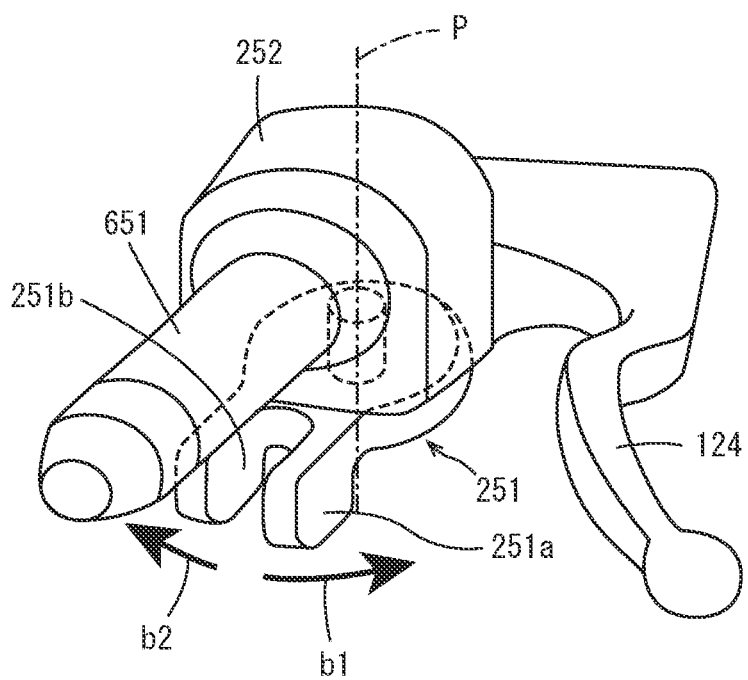

LEANING VEHICLE

CROSS REFERENCE TO RELATED APPLICATIONS

This is a continuation-in-part application of international application PCT/JP2019/046877, filed on Nov. 29, 2019, which claims priority from a Japanese patent application no. 2018-224261, filed on Nov. 29, 2018, the contents of which are incorporated herein by reference.

The present application is related to two co-pending applications, which are filed on the same date as the present application, and are continuation-in-part applications of international applications PCT/JP2019/046865 and PCT/JP2019/046866, both filed on Nov. 29, 2019, respectively.

TECHNICAL FIELD

The present teaching relates to a leaning vehicle.

BACKGROUND ART

There has been known a vehicle including a vehicle body frame, left and right front wheels disposed at the left and the right, respectively, when the vehicle is seen from the front, and a linkage mechanism. As such a vehicle, Patent Document 1 and Non-patent Document 1, for example, disclose vehicles each including a vehicle body frame, left and right front wheels, and a linkage mechanism disposed above the left and right front wheels and configured to change relative positions of the left and right front wheels relative to the vehicle body frame to cause the vehicle body frame to lean leftward or rightward of the vehicle.

The vehicle disclosed in Patent Document 1 includes a load transfer mechanism configured to include a left-foot-placing face on which a left foot of a driver of the vehicle is placed and a right-foot-placing face on which a right foot of the driver is placed, and configured such that a load is allowed to be transferred to a left portion of the linkage mechanism through one of the left-foot-placing face or the right-foot-placing face and that a load is allowed to be transferred to a right portion of the linkage mechanism through the other of the left-foot-placing face or the right-foot-placing face.

CITATION LIST

Patent Document

Patent Document 1: Japanese Patent Application Publication No. 2017-94906

Non-Patent Document

Non-patent Document 1: "TRITOWN", YAMAHA HATSU-DOKI KABUSHIKI KAISHA, [searched on Oct. 1, 2018], Internet

SUMMARY OF INVENTION

Technical Problem

The vehicle disclosed in Patent Document 1 leans leftward or rightward when a driver gets on or off the vehicle. Thus, the driver has difficulty in getting on or off the vehicle. If the vehicle that leans leftward or rightward as described above moves forward or rearward when the driver gets on or off, the driver has more difficulty in getting on or off the vehicle. Thus, the vehicle that leans leftward or rightward as described above requires easiness for a driver in getting on or off.

The present teaching has an object of providing a leaning vehicle that leans leftward or rightward and is easy for drivers to get on or off.

Solution to the Problem

The inventor of the present teaching has studied a leaning vehicle that leans leftward or rightward and is easy for drivers to get on or off.

In the leaning vehicles described in Patent Document 1 and Non-patent Document 1, a driver gets on or off from the left of the vehicle body frame in some cases and gets on or off from the right of the vehicle body frame in the other cases. For example, in the case where the driver gets on from the left of the vehicle body frame, the driver initially places the left foot on the left-foot-placing face of the leaning vehicle. A load applied to the left-foot-placing face from the left foot of the driver applies a load that causes the vehicle body frame to lean leftward to the leaning vehicle. At this time, the driver has to get on the leaning vehicle while preventing movement of the leaning vehicle in the front-rear direction as well as balancing the leaning vehicle such that the leaning vehicle does not fall to the left.

In a case where the driver gets off to the left of the vehicle body frame, the driver initially lifts the right foot from the right-foot-placing face of the leaning vehicle. That is, a load of the driver is applied only to the left-foot-placing face of the leaning vehicle. Accordingly, the load of the driver applied to the left-foot-placing face applies a force that causes the vehicle body frame to lean leftward to the leaning vehicle. At this time, the driver has to get off the leaning vehicle while preventing movement of the leaning vehicle in the front-rear direction as well as balancing the leaning vehicle such that the leaning vehicle does not fall to the left.

In a case where the driver gets on or off from the right of the vehicle body frame, the load applied to the leaning vehicle described above is different from the case where the driver gets on or off from the left of the vehicle body frame in that a location to which the load is applied is reversed in the left-right direction. Thus, description of the force applied to the vehicle body frame in the case where the driver gets on or off from the right of the vehicle body frame will be omitted.

In a case where the driver gets on or off the leaning vehicle in an inclined place, the leaning vehicle is subjected to a force that moves the leaning vehicle in the front-rear direction by gravity. At this time, the driver has to get on or off while holding the position of the leaning vehicle in the front-rear direction so as to prevent the leaning vehicle from moving forward or rearward. That is, in getting on or off the leaning vehicle in, for example, an inclined place, the driver has to get on or off while restricting movement of the leaning vehicle in the front-rear direction with, for example, a brake.

As described above, the inventor noticed that in getting on or off the leaning vehicle, the driver can easily get on or off the leaning vehicle by restricting not only leaning of the leaning vehicle in the left-right direction but also movement of the leaning vehicle in the front-rear direction.

In consideration of the foregoing points, the inventor has arrived at a configuration described below through an intensive study.

A leaning vehicle according to one embodiment of the present teaching is a leaning vehicle that leans leftward when turning left and leans rightward when turning right. The leaning vehicle includes: a vehicle body frame; a left front wheel disposed left of the vehicle body frame in a left-right direction of the vehicle body frame; a right front wheel disposed right of the vehicle body frame in the left-right direction of the vehicle body frame; a rear wheel disposed behind the left front wheel and the right front wheel in a front-rear direction of the vehicle body frame; a braking mechanism configured to apply a braking force to at least one of the left front wheel, the right front wheel, or the rear wheel; a linkage mechanism supported by the vehicle body frame, the linkage mechanism being configured to change a relative position of the left front wheel and a relative position of the right front wheel, in a top-bottom direction of the vehicle body frame, with respect to the vehicle body frame, to thereby cause the vehicle body frame to lean leftward or rightward in the left-right direction of the vehicle body frame; a lean lock mechanism configured to restrict leftward leaning and rightward leaning of the vehicle body frame; and an interlocking mechanism configured to actuate the braking mechanism and the lean lock mechanism. The interlocking mechanism includes an operation input section configured to input a first operating force, a brake-operation-input section configured to input a second operating force, an operating force distributor configured to distribute the first operating force input by the operation input section to the lean lock mechanism and the braking mechanism, and a brake actuator configured to actuate the braking mechanism by the first operating force distributed to the braking mechanism by the operating force distributor, or by the second operating force input by the brake-operation-input section.

With this configuration, the braking mechanism and the lean lock mechanism can be actuated by an operation input of the operation input section. Thus, it is possible to restrict movement of the leaning vehicle in the front-rear direction while restricting leftward or rightward leaning of the leaning vehicle. In this manner, the driver can easily get on or off the leaning vehicle even in an inclined place.

In addition, by actuating the braking mechanism and the lean lock mechanism with the operation input of the operation input section as described above, the braking mechanism and the lean lock mechanism can be easily actuated by one operation.

In another aspect, the leaning vehicle preferably has the following configuration. The leaning vehicle further includes: a left-foot-placing part located between the left front wheel and the rear wheel, for a left foot of a driver riding on the leaning vehicle to be placed thereon; a right-foot-placing part located between the right front wheel and the rear wheel, for a right foot of the driver to be placed thereon; a left suspension part having an upper portion and a lower portion, the lower portion thereof supporting the left front wheel; and a right suspension part having an upper portion and a lower portion, the lower portion thereof supporting the right front wheel. The linkage mechanism includes a left side member coupled to the upper portion of the left suspension part, such that the upper portion of the left suspension part is rotatable about a left steering axis, the left steering axis extending in the top-bottom direction of the vehicle body frame, a right side member coupled to the upper portion of the right suspension part, such that the upper portion of the right suspension part is rotatable about a right steering axis, the right steering axis being parallel to the left steering axis, and a lower cross member having a front cross part located, in the front-rear direction of the vehicle body frame, in front of the vehicle body frame, the left side member, and the right side member, the front cross part having a left end portion, a right end portion and an intermediate portion, and a rear cross part located, in the front-rear direction of the vehicle body frame, behind the vehicle body frame, the left side member, and the right side member, the rear cross part having a left end portion, a right end portion and an intermediate portion, wherein the left side member is coupled to the left end portion of the front cross part and the left end portion of the rear cross part, such that the left side member is rotatable about a left axis extending in the front-rear direction of the vehicle body frame, the right side member is coupled to the right end portion of the front cross part and the right end portion of the rear cross part, such that the right side member is rotatable about a right axis parallel to the left axis, and the intermediate portions of the front cross part and of the rear cross part are supported by the vehicle body frame, such that the intermediate portions are rotatable about an intermediate axis parallel to the left axis and the right axis. The left-foot-placing part is connected to the left side member of the linkage mechanism. The right-foot-placing part is connected to the right side member of the linkage mechanism. The lean lock mechanism restricts movement of the left-foot-placing part and the right-foot-placing part with respect to the vehicle body frame.

With this configuration, the lean lock mechanism can restrict leftward leaning or rightward leaning of the leaning vehicle.

In another aspect, the leaning vehicle preferably has the following configuration. The braking mechanism applies the braking force to the rear wheel.

Accordingly, with the operation input of the operation input section, it is possible to apply a braking force to the rear wheel of the leaning vehicle while restricting leftward leaning or rightward leaning of the leaning vehicle. Thus, the leaning vehicle that is easy for a driver to get on or off can be obtained.

In another aspect, the leaning vehicle preferably has the following configuration. The braking mechanism includes a front-wheel-braking mechanism configured to apply the braking force, by using a hydraulic pressure, to at least one of the left front wheel or the right front wheel.

With this configuration, for at least one of the left front wheel or the right front wheel, the front-wheel-braking mechanism can be easily disposed, and a braking force can be adjusted.

In another aspect, the leaning vehicle preferably has the following configuration. The lean lock mechanism includes a lean lock disc configured to be movable with respect to the vehicle body frame, and a lean lock caliper provided in the vehicle body frame and configured to apply friction force to the lean lock disc in a thickness direction when the lean lock mechanism is actuated. The interlocking mechanism actuates the lean lock caliper by an operation input of the operation input section.

With the configuration described above, leftward leaning or rightward leaning of the vehicle body frame by the linkage mechanism can be more reliably restricted with a compact configuration.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of a leaning vehicle according to the present teaching will be herein described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Leaning Vehicle]

A leaning vehicle herein is a vehicle that turns in a leaning posture. Specifically, the leaning vehicle is a vehicle that leans leftward when turning to the left and leans rightward when turning to the right in the left-right direction of the vehicle. The leaning vehicle may be a single-passenger vehicle or a vehicle on which a plurality of passengers can ride. The leaning vehicle includes all the types of vehicles that turn in leaning postures, such as three-wheeled vehicles and four-wheeled vehicles as well as two-wheeled vehicles.

Advantageous Effects of Invention

According to one embodiment of the present teaching, it is possible to provide a leaning vehicle that leans leftward or rightward and is easy for a driver to get on or off.

BRIEF DESCRIPTION OF DRAWINGS

FIG. 9 is a view of a throttle device having another configuration when seen from the right of the vehicle body frame.

DESCRIPTION OF EMBODIMENT

Figure 1:
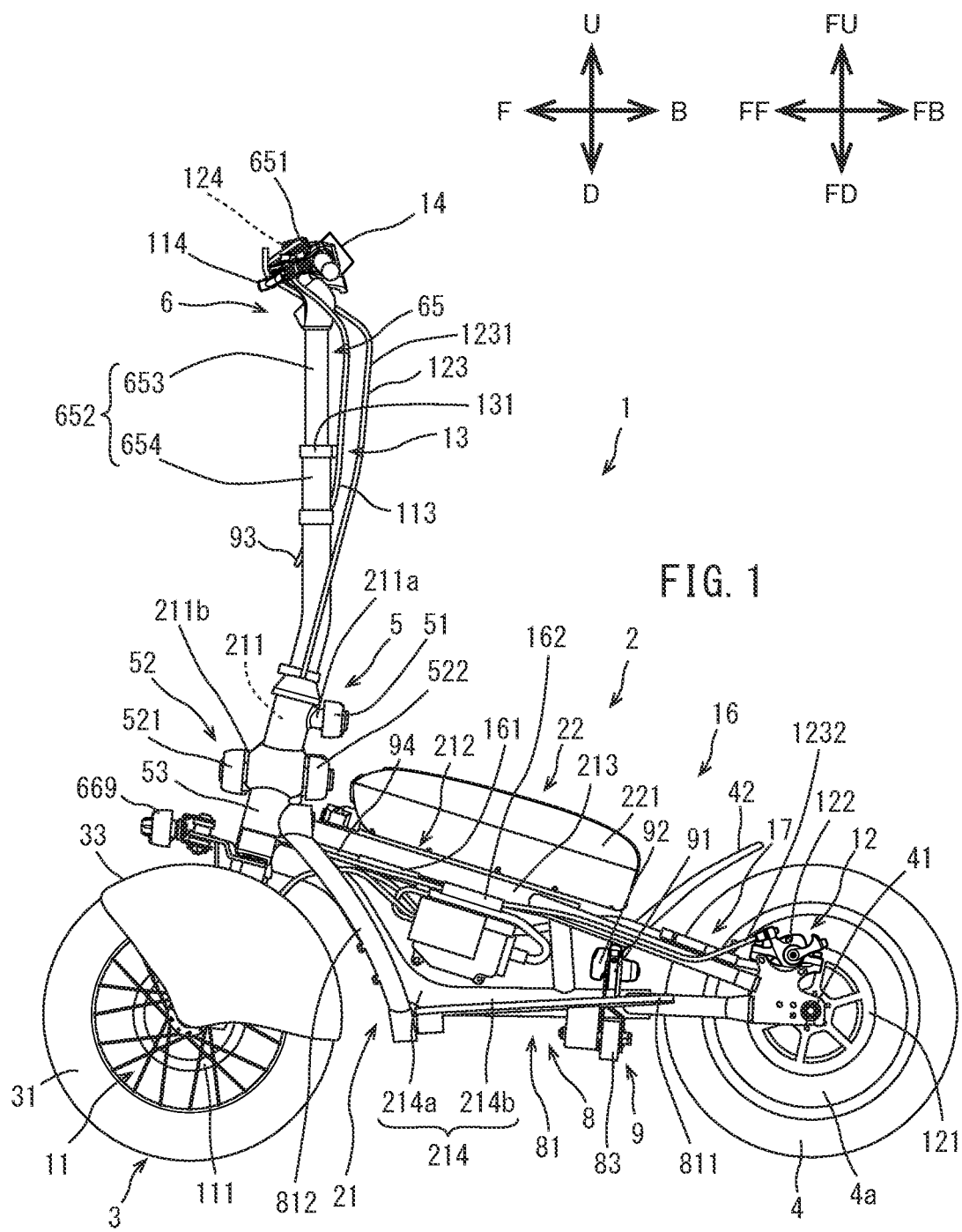
FIG. 1 is a left side view schematically illustrating an overall configuration of a leaning vehicle according to an embodiment.

An embodiment will be described hereinafter with reference to the drawings. In the drawings, the same or corresponding parts are denoted by the same reference numerals, and the description thereof will not be repeated. The dimensions of components in the drawings do not strictly represent actual dimensions of the components and dimensional proportions of the components.

In the following description, arrow F in the drawings represents a forward direction of a leaning vehicle 1. Arrow B in the drawings represents a rearward direction of the leaning vehicle 1. Arrow U in the drawings represents an upward direction of the leaning vehicle 1. Arrow D in the drawings represents a downward direction of the leaning vehicle 1. Arrow R in the drawings represents a rightward direction of the leaning vehicle 1. Arrow L in the drawings represents a leftward direction of the leaning vehicle 1. A front-rear direction, a left-right direction, and a top-bottom direction of the leaning vehicle 1 refer to a front-rear direction, a left-right direction, and a top-bottom direction, respectively, with respect to the leaning vehicle 1 when seen from a driver of the leaning vehicle 1.

The leaning vehicle 1 according to this embodiment turns with a vehicle body frame leaning leftward or rightward with respect to a vertical direction. Thus, in addition to the directions with respect to the vehicle, directions with respect to the vehicle body frame are defined as follows. Arrow FF in the drawings represents a forward direction of the vehicle body frame. Arrow FB in the drawings represents a rearward direction of the vehicle body frame. Arrow FU in the drawings represents an upward direction of the vehicle body frame. Arrow FD in the drawings represents a downward direction of the vehicle body frame. Arrow FR in the drawings represents a rightward direction of the vehicle body frame. Arrow FL in the drawings represents a leftward direction of the vehicle body frame. A front-rear direction, a left-right direction, and a top-bottom direction of the vehicle body frame refer to a front-rear direction, a left-right direction, and a top-bottom direction, respectively, with respect to the vehicle body frame when seen from a driver of the leaning vehicle 1.

(Overall Configuration)

FIG. 1 is a left side view schematically illustrating an overall configuration of the leaning vehicle 1 according to the embodiment. FIG. 1 is a left side view illustrating a state where a vehicle body cover is detached from the leaning vehicle 1. The leaning vehicle 1 includes a vehicle body 2, a pair of left and right front wheels 3, a rear wheel 4, a linkage mechanism 5, a steering mechanism 6, a load transfer mechanism 8, a lean lock mechanism 9, a front-wheel-braking mechanism 11, a rear-wheel-braking mechanism 12 (braking mechanism), an extension/contraction adjusting mechanism 13, a meter 14, a throttle device (see FIG. 2), an interlocking mechanism 16 (see FIG. 14), and a lock mechanism 17. That is, the leaning vehicle 1 in this embodiment is a three-wheeled vehicle including the pair of left and right front wheels 3. The leaning vehicle 1 is a vehicle that leans leftward when turning to the left and leans rightward when turning to the right.

The vehicle body 2 includes a vehicle body frame 21 and a power unit 22. In FIG. 1, the vehicle body frame 21 is in an upright state. In the case of referring to FIG. 1, the following description is based on a premise that the vehicle body frame 21 is in the upright state. The upright state of the vehicle body frame 21 refers to a state where the top-bottom direction of the vehicle body frame 21 coincides with the vertical direction.

The vehicle body frame 21 supports the power unit 22, for example. The vehicle body frame 21 includes a head pipe 211 and a main frame 212.

The head pipe 211 is located in a front portion of the leaning vehicle 1. When the leaning vehicle 1 is seen from the left, an upper portion of the head pipe 211 is located at the rear of a lower portion of the head pipe 211 in the front-rear direction of the vehicle body frame 21. The linkage mechanism 5 is disposed around the head pipe 211. A steering shaft 652 described later is rotatably inserted in the head pipe 211.

The main frame 212 is connected to the head pipe 211. The main frame 212 is located at the rear of the head pipe 211 in the front-rear direction of the vehicle body frame 21. The main frame 212 supports the power unit 22. A rear end portion of the main frame 212 supports the rear wheel 4 such that the rear wheel 4 is rotatable about a wheel shaft 41.

The main frame 212 includes an upper frame 213 and an under frame 214.

When the vehicle body frame 21 is seen from the left, the upper frame 213 extends rearward in the front-rear direction of the vehicle body frame 21 and downward in the top-bottom direction of the vehicle body frame 21 from the head pipe 211 toward the rear wheel 4. A rear end portion of the upper frame 213 supports the rear wheel 4 together with an under frame rear portion 214b described later. The power unit 22 is supported by the upper frame 213.

The under frame 214 includes an under frame front portion 214a and the under frame rear portion 214b. When the vehicle body frame 21 is seen from the left, the under frame front portion 214a extends, from the head pipe 211, rearward in the front-rear direction of the vehicle body frame 21 and downward in the top-bottom direction of the vehicle body frame 21. A front end portion of the under frame front portion 214a is connected to the head pipe 211. The under frame rear portion 214b extends rearward from a rear end portion of the under frame front portion 214a in the front-rear direction of the vehicle body frame 21. A rear end portion of the under frame rear portion 214b supports the rear wheel 4 together with the upper frame 213.

As described above, since the main frame 212 includes the upper frame 213 and the under frame 214, strength and rigidity of the main frame 212 can be increased. In the case of further reducing the height of the main frame in the top-bottom direction of the vehicle body frame, the main frame may include only the under frame.

Figure 2:
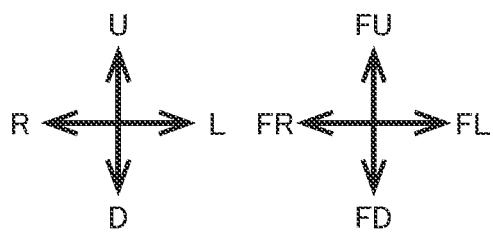
FIG. 2 is a front view illustrating a configuration of a vehicle front portion when the leaning vehicle is seen from the front.
Figure 2:
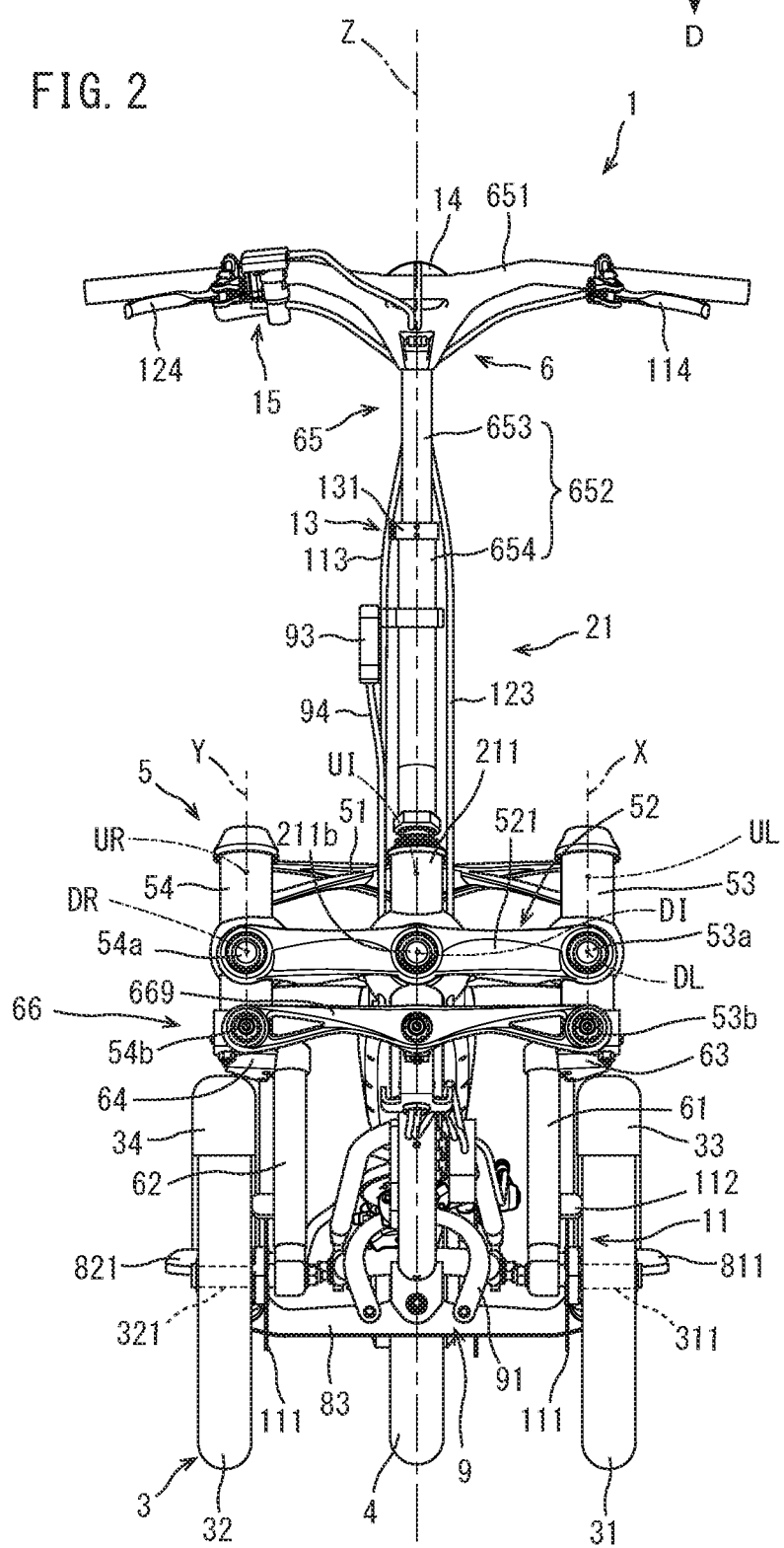

FIG. 2 is a front view of a front portion of the leaning vehicle 1 when seen from the front. FIG. 2 is a front view illustrating a state where the vehicle body cover is detached from the leaning vehicle 1. In FIG. 2, the vehicle body frame 21 is in an upright state. In the case of referring to FIG. 2, the following description is based on a premise that the vehicle body frame 21 is in the upright state.

As illustrated in FIGS. 1 and 2, the pair of left and right front wheels 3 is located below the head pipe 211 and the linkage mechanism 5 in the top-bottom direction of the vehicle body frame 21. As illustrated in FIG. 2, the pair of left and right front wheels 3 is supported by a left suspension part 61 and a right suspension part 62 described later.

A braking force is applied to each of the pair of left and right front wheels 3 by the front-wheel-braking mechanism 11. As illustrated in FIG. 2, the front-wheel-braking mechanism 11 includes front-wheel-brake discs 111, front-wheel-brake calipers 112, front-wheel-brake hoses 113, and a front-wheel-brake lever 114.

The front-wheel-brake discs 111 are disc-shaped members and rotate together with the front wheels 3. The front-wheel-brake calipers 112 are individually attached to the left suspension part 61 and the right suspension part 62. The front-wheel-brake calipers 112 actuate by changing a hydraulic pressure in the front-wheel-brake hoses 113. The hydraulic pressure in the front-wheel-brake hoses 113 changes in accordance with an operation of the front-wheel-brake lever 114 provided in a handlebar 651. Thus, in accordance with the operation of the front-wheel-brake lever 114, the front-wheel-brake calipers 112 sandwich the front-wheel-brake discs 111 in the thickness direction and apply a friction force to the front-wheel-brake discs 111.

As described above, since the front-wheel-brake calipers 112 provided in the pair of left and right front wheels 3 are driven by the hydraulic pressure, the direction in which the front-wheel-brake hoses 113 extend with respect to the front-wheel-brake calipers 112 can be freely changed. Accordingly, flexibility of layout of the front-wheel-brake calipers 112 can be obtained.

As illustrated in FIG. 1, the rear wheel 4 is located at the rear of the pair of left and right front wheels 3 in the front-rear direction of the vehicle body frame 21. A braking force is applied to the rear wheel 4 by the rear-wheel-braking mechanism 12.

The rear-wheel-braking mechanism 12 includes a rear-wheel-brake disc 121, a rear-wheel-brake caliper 122, a rear-wheel-brake wire 123, and a rear-wheel-brake lever 124 (brake-operation-input section) (see FIG. 2).

The rear-wheel-brake disc 121 is a disc-shaped member and rotates together with the rear wheel 4. The rear-wheel-brake caliper 122 is attached to the rear end portion of the main frame 212. The rear-wheel-brake caliper 122 is actuated since an operation of the rear-wheel-brake lever 124 is transferred to the rear-wheel-brake caliper 122 through the rear-wheel-brake wire 123. Thus, in accordance with the operation of the rear-wheel-brake lever 124, the rear-wheelbrake caliper 122 sandwiches the rear-wheel-brake disc 121 in the thickness direction and applies a friction force to the rear-wheel-brake disc 121.

Figure 3:
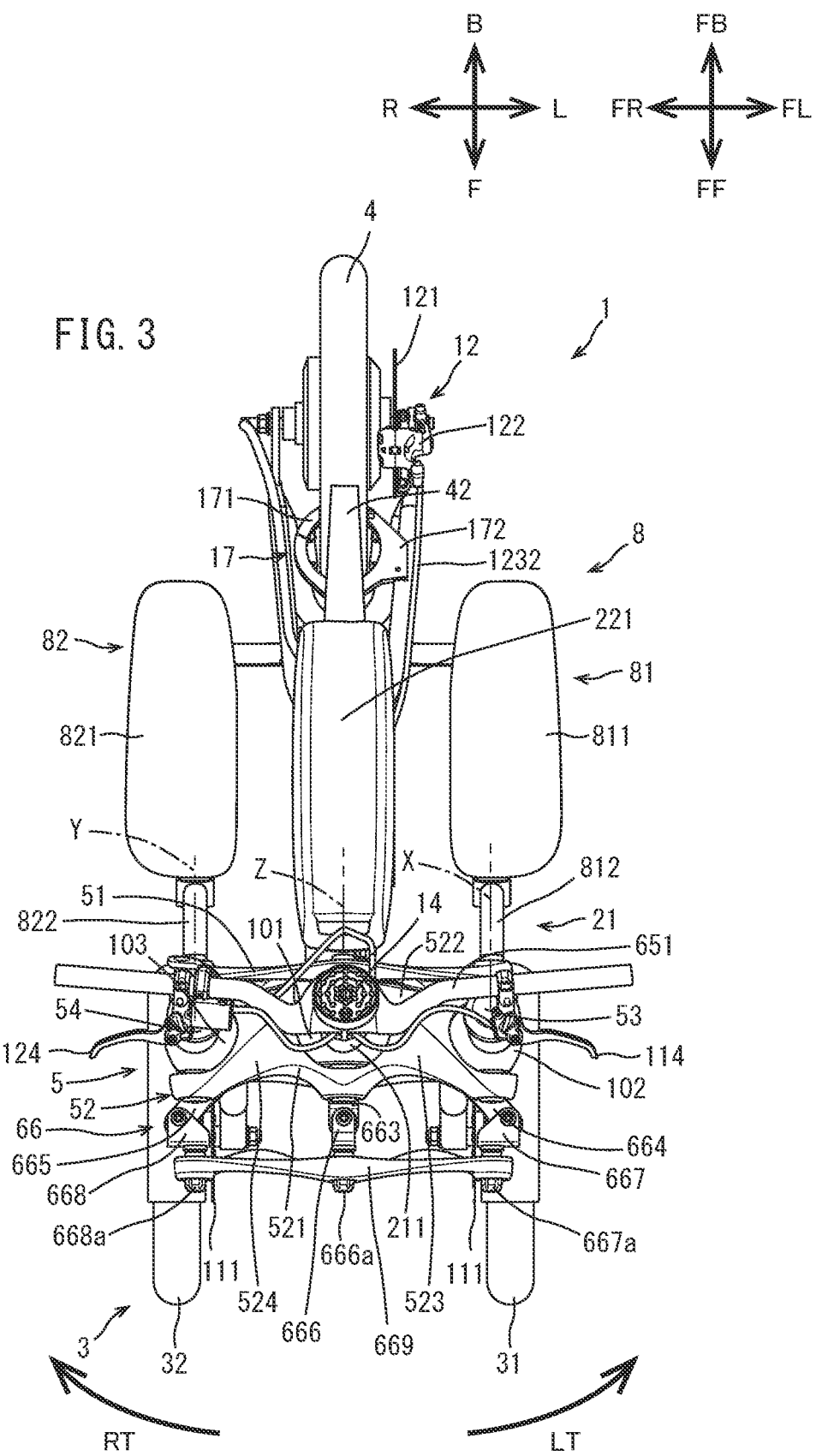
FIG. 3 is a top view when the leaning vehicle is seen from above.

Rotation of the rear wheel 4 is capable of being restricted by the lock mechanism 17. As illustrated in FIG. 3, the lock mechanism 17 includes a ring part 171 through which the rear wheel 4 penetrates in a locked state, and a fixing part 172 to which the ring part 171 is fixed in the locked state while holding the ring part 171 such that the ring part 171 is rotatable in a circumferential direction. That is, the lock mechanism 17 is a so-called ring-type lock mechanism.

In this embodiment, the fixing part 172 restricts movement of the ring part 171 with a solenoid in the locked state. When power is turned on by a power-supply-operation section 142 of the meter 14 described later, the solenoid of the fixing part 172 is driven to thereby unlock the ring part 171. In fixing the ring part 171 by the fixing part 172, the ring part 171 is manually rotated in the circumferential direction to be moved to a fixing position of the fixing part 172.

In the top-bottom direction of the vehicle body frame 21, a rear fender 42 is located above the rear wheel 4. The rear fender 42 is fixed to the main frame 212. The rear fender 42 extends, from the main frame 212, rearward in the front-rear direction of the vehicle body frame 21 and upward in the top-bottom direction of the vehicle body frame 21.

The rear fender may be fixed to the wheel shaft 41 by a strut. The rear fender may be fixed to the main frame 212 by a strut. The rear fender may be fixed to both the wheel shaft 41 and the main frame 212. The rear fender may be divided into a front portion and a rear portion in the front-rear direction of the vehicle body frame 21. In this case, the front portion of the rear fender is fixed to, for example, the main frame 212. The rear portion of the rear fender is fixed to, for example, the wheel shaft 41. A taillight may be provided in the rear fender as one unit.

The power unit 22 generates a driving force for causing the leaning vehicle 1 to travel. As illustrated in FIG. 1, the power unit 22 is located at the front of the wheel shaft 41 of the rear wheel 4 in the front-rear direction of the vehicle body frame 21. The power unit 22 is fixed to the vehicle body frame 21. The power unit 22 includes an unillustrated motor and a battery 221. In this embodiment, the motor is disposed in a wheel 4*a* of the rear wheel 4. Electric power is supplied to the motor from the battery 221 fixed to the upper frame 213 of the vehicle body frame 21.

As illustrated in FIG. 2, the pair of left and right front wheels 3 includes a left front wheel 31 and a right front wheel 32. The left front wheel 31 is located at the left of the head pipe 211 that is a part of the vehicle body frame 21 in the left-right direction of the vehicle body frame 21. The right front wheel 32 is located at the right of the head pipe 211 in the left-right direction of the leaning vehicle 1. That is, the left front wheel 31 and the right front wheel 32 are disposed side by side in the left-right direction of the vehicle body frame 21.

As illustrated in FIG. 2, the left front wheel 31 is connected to the left suspension part 61. Specifically, the left front wheel 31 is connected to a lower portion of the left suspension part 61. The left front wheel 31 is supported by the left suspension part 61 to be rotatable about a left axle 311. The left axle 311 is disposed in the lower portion of the left suspension part 61 and extends in the left-right direction of the vehicle body frame 21.

The right front wheel 32 is connected to the right suspension part 62. Specifically, the right front wheel 32 is connected to a lower portion of the right suspension part 62.

The right front wheel 32 is supported by the right suspension part 62 to be rotatable about a right axle 321. The right axle 321 is disposed in the lower portion of the right suspension part 62 and extends in the left-right direction of the vehicle body frame 21.

In the top-bottom direction of the vehicle body frame 21, a left front fender 33 is located above the left front wheel 31. In the top-bottom direction of the vehicle body frame 21, a right front fender 34 is located above the right front wheel 32. The left front fender 33 is fixed to the left axle 311 of the left front wheel 31. The right front fender 34 is fixed to the right axle 321 of the right front wheel 32.

The left front fender may be fixed to the left suspension part 61 described later. The left front fender may be fixed to the left axle 311 or the left suspension part 61 by a strut. The left front fender may be fixed to a left-foot-placing part 811 or a left coupling member 812 in the load transfer mechanism 8 described later. The left front fender may be divided into a front portion and a rear portion in the front-rear direction of the vehicle body frame 21. In this case, the front portion of the left front fender is fixed to, for example, a left bracket 63 of the steering mechanism 6 described later. The rear portion of the left front fender may be fixed to the left-foot-placing part 811 or the left coupling member 812, or may be fixed to the left axle 311 or the left suspension part 61 by a strut.

The right front fender may be fixed to the right suspension part 62 described later. The right front fender may be fixed to the right axle 321 or the right suspension part 62 by a strut. The right front fender may be fixed to a right-foot-placing part 821 or a right coupling member 822 in the load transfer mechanism 8 described later. The right front fender may be divided into a front portion and a rear portion in the front-rear direction of the vehicle body frame 21. In this case, the front portion of the right front fender is fixed to, for example, a right bracket 64 of the steering mechanism 6 described later. The rear portion of the right front fender may be fixed to the right-foot-placing part 821 or the right coupling member 822, or may be fixed to the right axle 321 or the right suspension part 62 by a strut.

Figure 4:
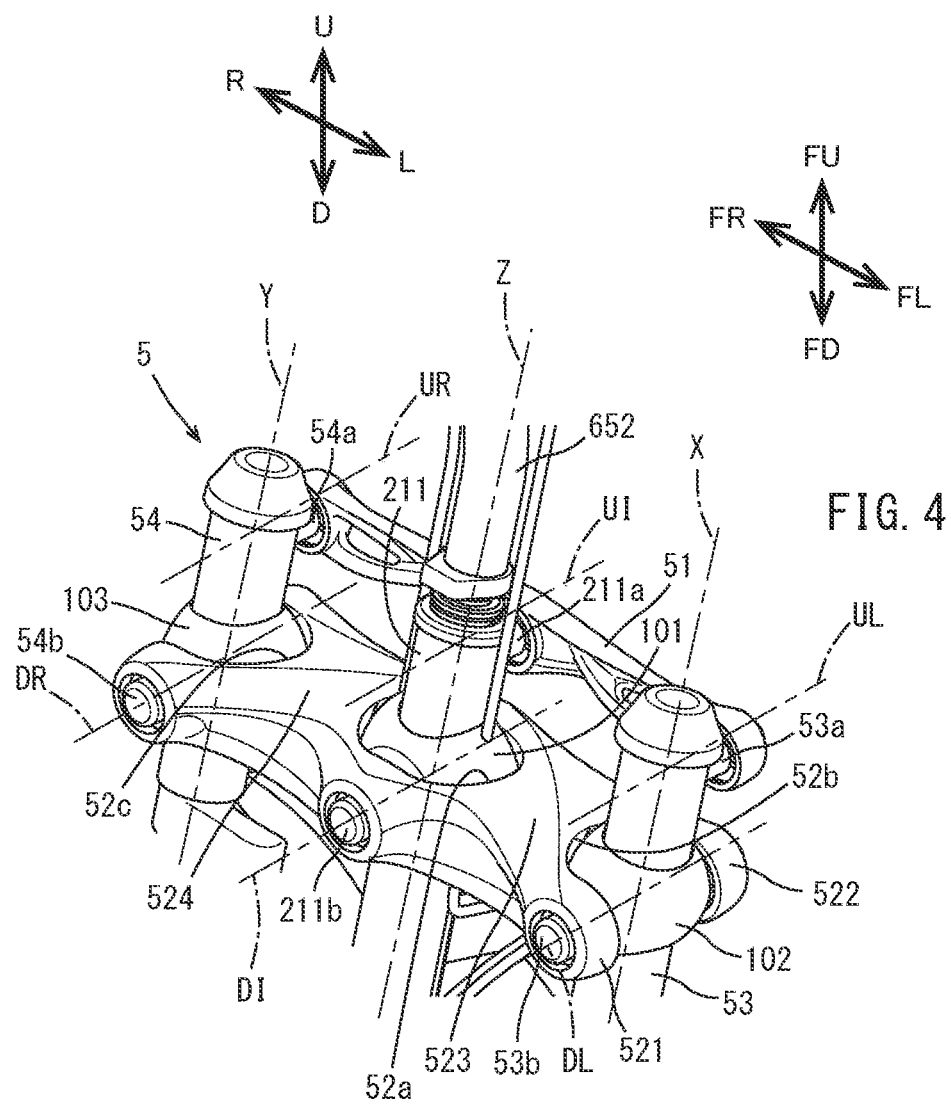
FIG. 4 is a perspective view illustrating a linkage mechanism in an enlarged manner.

FIG. 3 is a top view when the leaning vehicle 1 is seen from above in the top-bottom direction of the vehicle body frame 21. FIG. 4 is a perspective view illustrating the linkage mechanism 5 in an enlarged manner. In FIGS. 3 and 4, the vehicle body frame 21 is in an upright state. In the case of referring to FIGS. 3 and 4, the following description is based on a premise that the vehicle body frame 21 is in the upright state.

The linkage mechanism 5 is a linkage mechanism of a parallel four-bar linkage (also referred to as a parallelogram linkage) type.

As illustrated in FIG. 2, the linkage mechanism 5 is located below the handlebar 651 in the top-bottom direction of the vehicle body frame 21. The linkage mechanism 5 is located above the left front wheel 31 and the right front wheel 32 in the top-bottom direction of the vehicle body frame 21.

The linkage mechanism 5 includes an upper cross member 51, a lower cross member 52, a left side member 53, and a right side member 54. The linkage mechanism 5 is not interlocked with rotation of the steering shaft 652 about an intermediate steering axis Z caused by operation of the handlebar 651. That is, the linkage mechanism 5 does not rotate about the intermediate steering axis Z with respect to the vehicle body frame 21.

As illustrated in FIG. 1, the upper cross member 51 is located at the rear of the head pipe 211 in the front-rear direction of the vehicle body frame 21. As illustrated in FIG. 2, the upper cross member 51 extends in the left-right direction of the vehicle body frame 21.

As illustrated in FIGS. 1 and 2, the lower cross member 52 is located below the upper cross member 51 in the top-bottom direction of the vehicle body frame 21. The lower cross member 52 includes a front-lower-cross part 521 (front cross part), a rear-lower-cross part 522 (rear cross part), and lower-cross-coupling parts 523 and 524 (see FIG. 3).

As illustrated in FIG. 1, the front-lower-cross part 521 is located at the front of the head pipe 211 in the front-rear direction of the vehicle body frame 21. The rear-lower-cross part 522 is located at the rear of the head pipe 211 in the front-rear direction of the vehicle body frame 21. Each of the front-lower-cross part 521 and the rear-lower-cross part 522 extends in the left-right direction of the vehicle body frame 21.

As illustrated in FIGS. 3 and 4, each of the lower-cross-coupling parts 523 and 524 couples the front-lower-cross part 521 and the rear-lower-cross part 522 to each other in the front-rear direction of the vehicle body frame 21. Specifically, the lower-cross-coupling part 523 couples the front-lower-cross part 521 and the rear-lower-cross part 522 to each other at a location between the head pipe 211 and the left side member 53 in the left-right direction of the vehicle body frame 21. The lower-cross-coupling part 524 couples the front-lower-cross part 521 and the rear-lower-cross part 522 to each other at a location between the head pipe 211 and the right side member 54 in the left-right direction of the vehicle body frame 21.

In the lower cross member 52, the front-lower-cross part 521, the rear-lower-cross part 522, and the lower-cross-coupling parts 523 and 524 are integrally formed.

With the configuration described above, as illustrated in FIG. 4, the lower cross member 52 has a through hole 52a in which the head pipe 211 penetrates, between the lower-cross-coupling parts 523 and 524. In the left-right direction of the vehicle body frame 21, the lower cross member 52 has a left notch 52b in which the left side member 53 is located at the left end thereof, and a right notch 52c in which the right side member 54 is located at the right end thereof.

As illustrated in FIGS. 2 and 3, the left side member 53 is located at the left of the head pipe 211 in the left-right direction of the vehicle body frame 21. The left side member 53 is located above the left front wheel 31 in the top-bottom direction of the vehicle body frame 21. The left side member 53 extends in the direction in which the head pipe 211 extends. The left side member 53 extends in the direction in which the intermediate steering axis Z of the steering shaft 652 extends. An upper portion of the left side member 53 is located at the rear of a lower portion of the left side member 53 in the front-rear direction of the vehicle body frame 21.

The right side member 54 is located at the right of the head pipe 211 in the left-right direction of the vehicle body frame 21. The right side member 54 is located above the right front wheel 32 in the top-bottom direction of the vehicle body frame 21. The right side member 54 extends in the direction in which the head pipe 211 extends. The right side member 54 extends in the direction in which the intermediate steering axis Z of the steering shaft 652 extends. An upper portion of the right side member 54 is located at the rear of a lower portion of the right side member 54 in the front-rear direction of the vehicle body frame 21.

As illustrated in FIG. 4, the head pipe 211 includes an upper-intermediate-coupling part 211a and a lower-intermediate-coupling part 211b.

An intermediate portion of the upper cross member 51 is rotatably coupled to the head pipe 211 through the upper-intermediate-coupling part 211a. That is, the upper cross member 51 is rotatable with respect to the head pipe 211 about an upper-intermediate-coupling axis UI passing through the upper-intermediate-coupling part 211a and extending in the front-rear direction of the vehicle body frame 21.

An intermediate portion of the lower cross member 52 is rotatably coupled to the head pipe 211 through the lower-intermediate-coupling part 211b. That is, the lower cross member 52 is rotatable with respect to the head pipe 211 about a lower-intermediate-coupling axis DI (intermediate axis) passing through the lower-intermediate-coupling part 211b and extending in the front-rear direction of the vehicle body frame 21.

The left side member 53 includes an upper-left-coupling part 53a and a lower-left-coupling part 53b.

A left end portion of the upper cross member 51 is rotatably coupled to the left side member 53 through the upper-left-coupling part 53a. That is, the upper cross member 51 is rotatable with respect to the left side member 53 about an upper-left-coupling axis UL passing through the upper-left-coupling part 53a and extending in the front-rear direction of the vehicle body frame 21.

A left end portion of the lower cross member 52 is rotatably coupled to the left side member 53 through the lower-left-coupling part 53b. That is, the lower cross member 52 is rotatable with respect to the left side member 53 about a lower-left-coupling axis DL (left axis) passing through the lower-left-coupling part 53b and extending in the front-rear direction of the vehicle body frame 21.

The right side member 54 includes an upper-right-coupling part 54a and a lower-right-coupling part 54b.

A right end portion of the upper cross member 51 is rotatably coupled to the right side member 54 through the upper-right-coupling part 54a. That is, the upper cross member 51 is rotatable with respect to the right side member 54 about an upper-right-coupling axis UR passing through the upper-right-coupling part 54a and extending in the front-rear direction of the vehicle body frame 21.

A right end portion of the lower cross member 52 is rotatably coupled to the right side member 54 through the lower-right-coupling part 54b. That is, the lower cross member 52 is rotatable with respect to the right side member 54 about a lower-right-coupling axis DR (right axis) passing through the lower-right-coupling part 54b and extending in the front-rear direction of the vehicle body frame 21.

The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL extend mutually in parallel. The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL are located above the left front wheel 31 and the right front wheel 32 in the top-bottom direction of the vehicle body frame 21.

As described above, the upper cross member 51, the lower cross member 52, the left side member 53, and the right side member 54 are supported by the vehicle body frame 21 such that the upper cross member 51 and the lower cross member 52 are kept in parallel with each other, and the left side member 53 and the right side member 54 are kept in parallel with each other.

As illustrated in FIG. 2, the steering mechanism 6 includes the left suspension part 61, the right suspension part 62, the left bracket 63, the right bracket 64, a steering member 65, and a steering-force-transfer mechanism 66.

The left suspension part 61 supports the left front wheel 31 with respect to the linkage mechanism 5. The left suspension part 61 extends in a direction in which the intermediate steering axis Z extends. A lower end portion of the left suspension part 61 supports the left front wheel 31. An upper end portion of the left suspension part 61 is fixed to the left bracket 63.

The left bracket 63 includes an unillustrated left rotating member in an upper portion thereof. The left rotating member is located inside the left side member 53 of the linkage mechanism 5 and extends in the direction in which the left side member 53 extends. The left rotating member is rotatable about a left steering axis X with respect to the left side member 53. That is, the left bracket 63 is rotatable about the left steering axis X with respect to the left side member 53. The left steering axis X extends in the direction in which the left side member 53 extends.

As illustrated in FIG. 2, the left steering axis X extends in the top-bottom direction of the vehicle body frame 21, in parallel with the intermediate steering axis Z of the steering shaft 652.

The right bracket 64 includes an unillustrated right rotating member in an upper portion thereof. The right rotating member is located inside the right side member 54 of the linkage mechanism 5 and extends in the direction in which the right side member 54 extends. The right rotating member is rotatable about a right steering axis Y with respect to the right side member 54. That is, the right bracket 64 is rotatable about the right steering axis Y with respect to the right side member 54. The right steering axis Y extends in the direction in which the right side member 54 extends.

The right suspension part 62 supports the right front wheel 32 with respect to the linkage mechanism 5. The right suspension part 62 extends in the direction in which the intermediate steering axis Z extends. A lower end portion of the right suspension part 62 supports the right front wheel 32. An upper end portion of the right suspension part 62 is fixed to the right bracket 64.

As illustrated in FIG. 2, the right steering axis Y extends in the top-bottom direction of the vehicle body frame 21, in parallel with the intermediate steering axis Z of the steering shaft 652.

The linkage mechanism 5 of the leaning vehicle 1 having the configuration described above includes a first spacer 101, a second spacer 102, and a third spacer 103.

As illustrated in FIG. 4, in the linkage mechanism 5, the first spacer 101, the second spacer 102, and the third spacer 103 are disposed in portions where the head pipe 211, the left side member 53, and the right side member 54, respectively, intersect with the lower cross member 52.

As illustrated in FIG. 4, the first spacer 101 is located in the through hole 52a of the lower cross member 52 and attached to the head pipe 211 such that the first spacer 101 is located in a gap between the lower cross member 52 and the head pipe 211. That is, the first spacer 101 is located in a gap between the lower-cross-coupling part 523 of the lower cross member 52 and the head pipe 211 and in a gap between the lower-cross-coupling part 524 of the lower cross member 52 and the head pipe 211. The first spacer 101 is a spherical resin member. The head pipe 211 penetrates the first spacer 101 in the radial direction.

The first spacer 101 described above can prevent entering of foreign matter into the gaps between the head pipe 211 and the lower-cross-coupling parts 523 and 524.

As illustrated in FIG. 4, the second spacer 102 is located in the left notch 52b of the lower cross member 52 and attached to the left side member 53 such that the second spacer 102 is located in a gap between the lower-cross-coupling part 523 of the lower cross member 52 and the left side member 53. The second spacer 102 is a spherical resin member. The left side member 53 penetrates the second spacer 102 in the radial direction.

The second spacer 102 described above can prevent entering of foreign matter into the gap between the left side member 53 and the lower-cross-coupling part 523.

As illustrated in FIG. 4, the third spacer 103 is located in the right notch 52c of the lower cross member 52 and attached to the right side member 54 such that the third spacer 103 is located in a gap between the lower-cross-coupling part 524 of the lower cross member 52 and the right side member 54. The third spacer 103 is a spherical resin member. The right side member 54 penetrates the third spacer 103 in the radial direction.

The third spacer 103 described above can prevent entering of foreign matter into the gap between the right side member 54 and the lower-cross-coupling part 524.

The steering member 65 includes the handlebar 651 and the steering shaft 652.

The handlebar 651 is connected to an upper portion of the steering shaft 652. A part of the steering shaft 652 is rotatably supported by the head pipe 211. As illustrated in FIG. 1, the upper portion of the steering shaft 652 is located at the rear of a lower portion of the steering shaft 652 in the front-rear direction of the vehicle body frame 21. Accordingly, the intermediate steering axis Z of the steering shaft 652 tilts in the front-rear direction of the vehicle body frame 21 with respect to the top-bottom direction of the leaning vehicle 1. The steering shaft 652 rotates about the intermediate steering axis Z in accordance with an operation of the handlebar 651 by a driver.

When the vehicle body frame 21 is seen from the left, the steering shaft 652 is bent toward the front of the vehicle body frame 21 in an intermediate portion of the steering shaft 652 in the top-bottom direction of the vehicle body frame 21. That is, a portion of the steering shaft 652 located above the intermediate portion of the steering shaft 652 extends in the top-bottom direction of the vehicle body frame 21.

The steering shaft 652 includes an inner pipe 653 and an outer pipe 654. An upper portion of the inner pipe 653 is connected to the handlebar 651. A lower portion of the inner pipe 653 is located inside an upper portion of the outer pipe 654. As illustrated in FIG. 1, a lower portion of the outer pipe 654 extends in the direction in which the intermediate steering axis Z extends when the vehicle body frame 21 is seen from the left. The upper portion of the outer pipe 654 extends in the top-bottom direction of the vehicle body frame 21 when the vehicle body frame 21 is seen from the left. That is, the upper portion of the outer pipe 654 is bent toward the front of the vehicle body frame 21 with respect to the lower portion of the outer pipe 654, when the vehicle body frame 21 is seen from the left. A part of the lower portion of the outer pipe 654 is rotatably supported by the head pipe 211.

The inner pipe 653 and the outer pipe 654 are fixed by a fixing member 131 in a state where the lower portion of the inner pipe 653 is located inside the outer pipe 654. The fixing member 131 is located at an upper end portion of the outer pipe 654. The fixing member 131 retains the inner pipe 653 inside the outer pipe 654 by applying a fastening force to the upper end portion of the outer pipe 654 in the radial direction.

A structure of the fixing member 131 may be a structure that generates the fastening force by fastening a bolt or a structure that generates the fastening force by using the principle of leverage with a lever operation. That is, the fixing member 131 may have any structure as long as the inner pipe 653 is capable of being fixed to the outer pipe 654.

Figure 6:
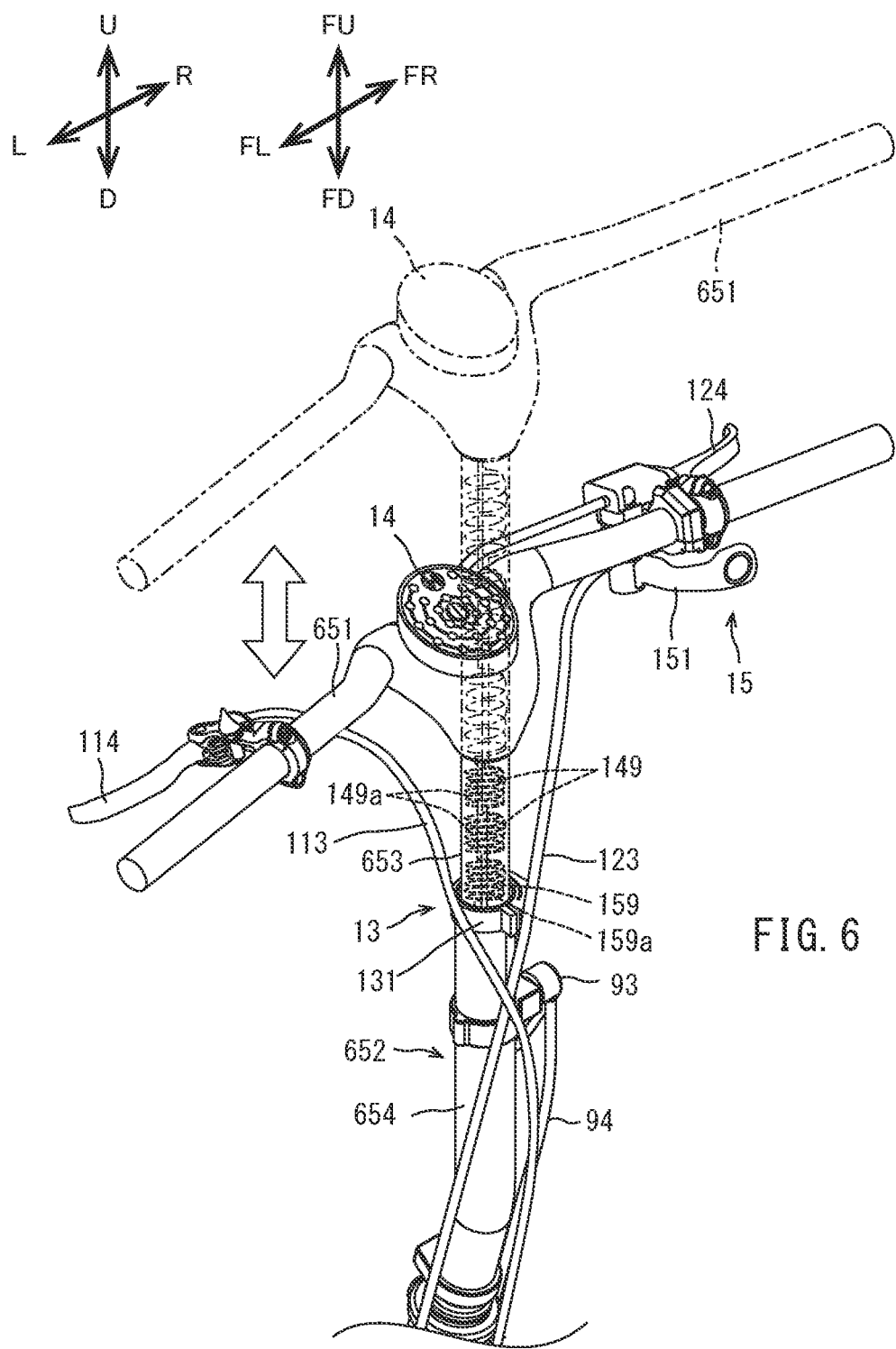
FIG. 6 is a view schematically illustrating a state where a position of a handlebar is changed by an extension/contraction adjusting mechanism.

As illustrated in FIG. 6, in the steering shaft 652 having the structure described above, the length of the steering shaft 652 is changeable by changing a position of the inner pipe 653 relative to the outer pipe 654 in the direction in which the inner pipe 653 extends. That is, the steering shaft 652 includes the extension/contraction adjusting mechanism 13 capable of extending and contracting in the direction in which the inner pipe 653 extends. The extension/contraction adjusting mechanism 13 includes the inner pipe 653 described above, the outer pipe 654, and the fixing member 131.

Since the steering shaft 652 includes the extension/contraction adjusting mechanism 13 as described above, a height position of the handlebar 651 can be adjusted and a distance between the handlebar 651 and a driver can be changed. Thus, it is possible to match with a driver's preference of a steering operation.

In FIG. 6, the handlebar 651 and the steering shaft 652, in a case where the height of the handlebar 651 is changed, are indicated by dot-dash lines. In FIG. 6, a direction in which the height of the handlebar 651 is changed is indicated by white arrows.

As illustrated in FIG. 6, two signal lines 149 of the meter 14 described later and a signal line 159 of the throttle device 15 described later are disposed inside the inner pipe 653 and the outer pipe 654. The two signal lines 149 of the meter 14 and the signal line 159 of the throttle device 15 include helically wound curl cords 149a and 159a, respectively. In this embodiment, the curl cords 149a of the signal lines 149 of the meter 14 and the curl cord 159a of the signal line 159 of the throttle device 15 are disposed inside at least one of the inner pipe 653 or the outer pipe 654. Although the number of the signal lines 149 of the meter 14 is two in this embodiment, the number of the signal lines 149 may be one or three or more. Another signal line may be disposed inside the inner pipe 653 and the outer pipe 654.

In this manner, in the case where the steering shaft 652 is extended or contracted by the extension/contraction adjusting mechanism 13 in the direction in which the intermediate steering axis Z extends as described above, it is possible to prevent hindering of extension or contraction of the steering shaft 652 by the signal lines 149 of the meter 14 and the signal line 159 of the throttle device 15. In addition, the signal lines 149 of the meter 14 and the signal line 159 of the throttle device 15 can be housed in a compact space in the steering shaft 652.

Figure 7:
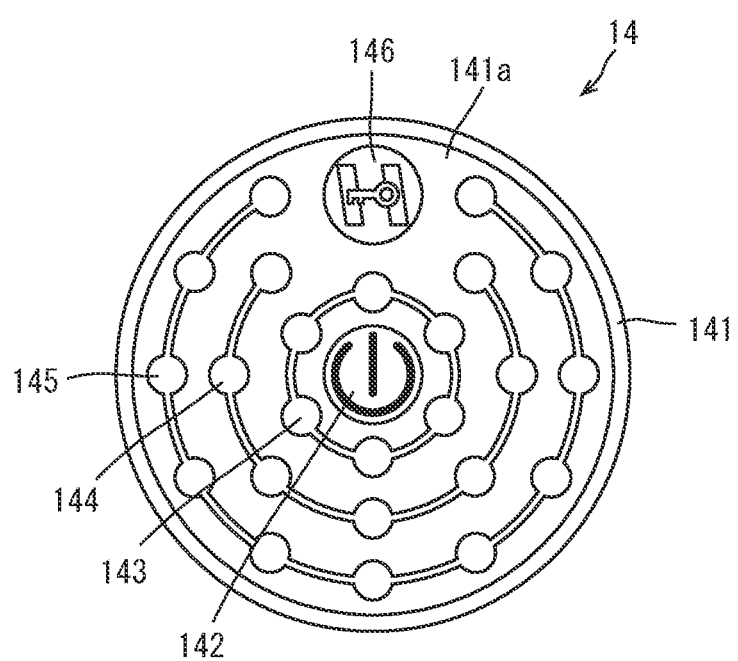
FIG. 7 is a plan view illustrating a configuration of a meter.

As illustrated in FIGS. 1 through 3, 5, and 6, the meter 14 is attached to the handlebar 651. The meter 14 indicates a vehicle state, a battery remaining capacity, and a vehicle speed, for example, of the leaning vehicle 1 to a driver. In this embodiment, as illustrated in FIG. 7, the meter 14 includes a disc-shaped body 141. The body 141 includes a circular display surface 141a at a position facing the driver.

The meter 14 includes, on the display surface 141a, the power-supply-operation section 142, a vehicle-state-display section 143, a battery-remaining-capacity-display section 144, a vehicle-speed-display section 145, and a lean-lock-display section 146. The signal lines 149 for transmitting signals are connected to the meter 14 (see FIG. 6). The signal lines 149 connect the meter 14 to an unillustrated controller.

The power-supply-operation section 142 communicates with, for example, a portable terminal of a driver wirelessly to thereby output a signal for turning the power supply of the leaning vehicle 1 on or off, to the unillustrated controller. The power-supply-operation section 142 is located at a center portion of the display surface 141a of the meter 14. The power-supply-operation section 142 may be a button switch.

The vehicle-state-display section 143 displays a vehicle state of the leaning vehicle 1. The vehicle-state-display section 143 displays an abnormal state of the leaning vehicle 1 such as a non-travelable state or, if the leaning vehicle 1 is travelable but maintenance is needed, for example, displays a warning to the driver. The vehicle-state-display section 143 displays the abnormal state in red and the warning in yellow, for example. In this manner, by displaying the vehicle state of the leaning vehicle 1 with colors, the driver is capable of easily knowing the vehicle state of the leaning vehicle 1. The vehicle-state-display section 143 is formed in a circular shape surrounding the power-supply-operation section 142.

The battery-remaining-capacity-display section 144 displays a battery remaining capacity of the battery 221 of the leaning vehicle 1. The battery-remaining-capacity-display section 144 displays the battery remaining capacity of the battery 221 by changing an illuminating range in accordance with the battery remaining capacity of the battery 221, for example. Since the battery-remaining-capacity-display section 144 displays the battery remaining capacity of the battery 221 not with numerals but with the illuminated range as described above, the driver is capable of easily knowing the battery remaining capacity of the battery 221. The battery-remaining-capacity-display section 144 is formed in a circular shape surrounding the vehicle-state-display section 143.

The vehicle-speed-display section 145 displays a vehicle speed of the leaning vehicle 1. The vehicle-speed-display section 145 displays the vehicle speed of the leaning vehicle 1 by changing an illuminated range in accordance with the vehicle speed of the leaning vehicle 1, for example. Since the vehicle-speed-display section 145 displays the vehicle speed of the leaning vehicle 1 not with numerals but with the illuminated range, the driver is capable of easily knowing the vehicle speed of the leaning vehicle 1. The vehicle-speed-display section 145 is formed in a circular shape surrounding the battery-remaining-capacity-display section 144.

The lean-lock-display section 146 displays whether or not leftward or rightward leaning of the vehicle body frame 21 is restricted by the lean lock mechanism 9 described later. The lean-lock-display section 146 acquires a detection signal for a holding state of a lean lock disc 91 from an unillustrated sensor provided in at least one of a lean lock caliper 92, a lean lock lever 93, a lean lock wire 94, or a first equalizer 161 described later. The lean-lock-display section 146 illuminates in a case where leftward or rightward leaning of the vehicle body frame 21 is restricted by the lean lock mechanism 9, for example. The lean-lock-display section 146 also includes an unillustrated loudspeaker. The lean-lock-display section 146 generates warning sound with the loudspeaker in a case where leftward or rightward leaning of the vehicle body frame 21 is restricted by the lean lock mechanism 9.

In a case where a throttle lever 151 described later is operated in a state where leftward or rightward leaning of the vehicle body frame 21 is restricted by the lean lock mechanism 9, the leaning vehicle 1 may perform control of cutting an output of the power unit 22 so as to prevent forward or rearward movement of the leaning vehicle 1 while generating warning sound with the loudspeaker.

Figure 8:
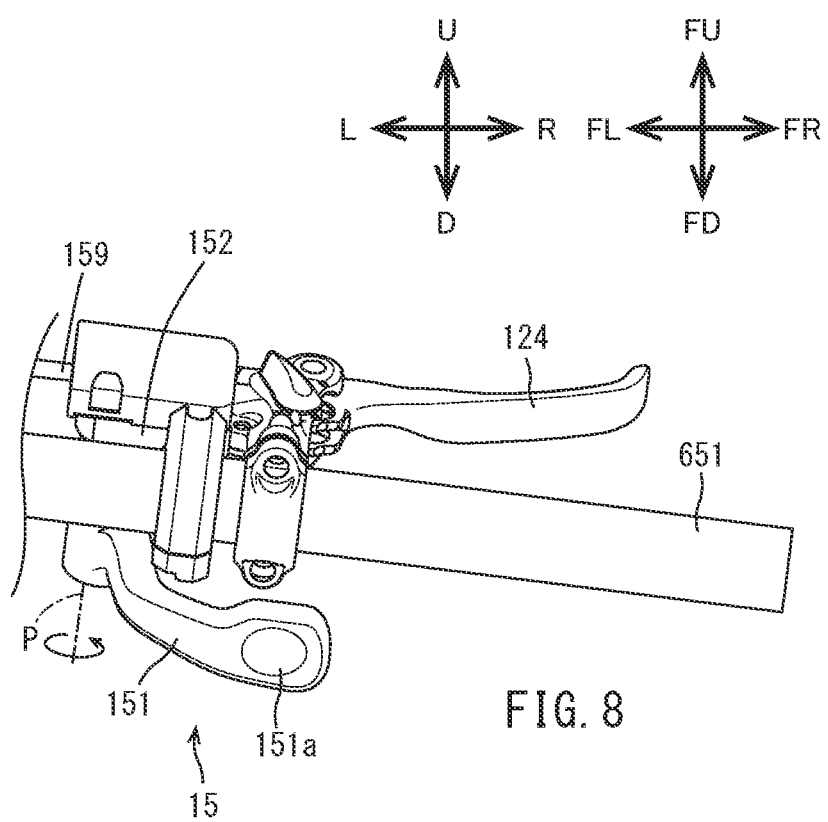
FIG. 8 is a view of a throttle device when seen from the rear of a vehicle body frame.

As illustrated in FIGS. 2, 5, 6, and 8, the handlebar 651 is provided with the throttle device 15 that is operated by a finger(s) of the driver. As illustrated in FIG. 8, the throttle device 15 includes a throttle lever 151 and a throttle-lever-support part 152.

The throttle lever 151 includes a first end portion and a second end portion at both ends thereof in the longitudinal direction. The first end portion of the throttle lever 151 in the longitudinal direction is supported by the throttle-lever-support part 152 to be rotatable about a rotation axis P extending in the top-bottom direction of the vehicle body frame 21. The throttle lever 151 includes a pressing part 151*a* that is pressed by a finger(s) of the driver, at the second end portion in the longitudinal direction.

The throttle-lever-support part 152 rotatably supports the first end portion of the throttle lever 151 in the longitudinal direction, and outputs a rotation angle of the throttle lever 151 as a throttle signal. The signal line 159 is connected to the throttle lever 151. The signal line 159 connects the throttle-lever-support part 152 and an unillustrated controller to each other.

An operation amount of the throttle lever 151 is transmitted, as a throttle signal, to the unillustrated controller through the signal line 159. The controller drives the power unit 22 in accordance with the throttle signal. Thus, the power unit 22 can be driven in accordance with the operation amount of the throttle lever 151.

As described above, the throttle device 15 including the throttle lever 151 configured to be operated by a finger(s) of the driver is used to control driving of the power unit 22, thereby enhancing operability in throttle operation.

In a case where the leaning vehicle 1 is capable of traveling rearward as well as forward, a forward or rearward throttle signal can be easily output from the throttle device in accordance with a rotation direction of a throttle lever 251, as illustrated in FIG. 9. FIG. 9 is a view schematically illustrating another example of the throttle lever, i.e., the throttle lever 251.

The throttle lever 251 includes a first pressing part 251*a* and a second pressing part 251*b* at a second end portion in the longitudinal direction. The first pressing part 251*a* is located at the front of the second pressing part 251*b* in the front-rear direction of the vehicle body frame 21.

When the driver pushes the second pressing part 251*b* of the throttle lever 251 forward to cause the throttle lever 251 to rotate toward the front of the vehicle body frame 21 about the rotation axis P extending in the top-bottom direction of the vehicle body frame 21 (i.e., to rotate in a direction b1 in FIG. 9), the throttle-lever-support part 252 outputs a forward throttle signal. When the driver pulls the second pressing part 251*b* of the throttle lever 251 rearward to cause the throttle lever 251 to rotate toward the rear of the vehicle body frame 21 about the rotation axis P (i.e., to rotate in a direction b2 in FIG. 9), the throttle-lever-support part 252 outputs a rearward throttle signal. Accordingly, by operating the throttle lever 251, the leaning vehicle 1 can be easily moved forward or rearward.

The throttle-lever-support part 252 may output a regeneration brake signal when the throttle lever 251 is rotated about the rotation axis P toward the rear of the vehicle body frame 21. The regeneration brake signal is a signal with which the unillustrated controller causes the motor to perform a regeneration operation.

Next, with reference to FIGS. 2 and 3, the steering-force-transfer mechanism 66 of the steering mechanism 6 will be described.

The steering-force-transfer mechanism 66 transfers a steering force when a driver operates the handlebar 651, to the left bracket 63 and the right bracket 64. As illustrated in FIG. 3, the steering-force-transfer mechanism 66 includes an intermediate transfer plate 663, a left transfer plate 664, a right transfer plate 665, an intermediate joint 666, a left joint 667, a right joint 668, and a tie rod 669.

The intermediate transfer plate 663 is connected to a lower portion of the steering shaft 652. The intermediate transfer plate 663 is non-rotatable with respect to the steering shaft 652. Thus, the intermediate transfer plate 663 is rotatable about the intermediate steering axis Z of the steering shaft 652 together with the steering shaft 652, with respect to the head pipe 211.

The left transfer plate 664 is located at the left of the intermediate transfer plate 663 in the left-right direction of the vehicle body frame 21. The left transfer plate 664 is connected to a lower portion of the left bracket 63. The left transfer plate 664 is non-rotatable with respect to the left bracket 63. Accordingly, the left transfer plate 664 is rotatable about the left steering axis X with respect to the left side member 53.

The right transfer plate 665 is located at the right of the intermediate transfer plate 663 in the left-right direction of the vehicle body frame 21. The right transfer plate 665 is connected to a lower portion of the right bracket 64. The right transfer plate 665 is non-rotatable with respect to the right bracket 64. Accordingly, the right transfer plate 665 is rotatable about the right steering axis Y with respect to the right side member 54.

As illustrated in FIG. 3, the intermediate joint 666 is coupled to a front portion of the intermediate transfer plate 663 through an intermediate joint steering shaft part extending in the top-bottom direction of the vehicle body frame 21. The intermediate transfer plate 663 and the intermediate joint 666 are rotatable relative to each other about the intermediate joint steering shaft part.

The left joint 667 is located at the left of the intermediate joint 666 in the left-right direction of the vehicle body frame 21. The left joint 667 is coupled to a front portion of the left transfer plate 664 through a left-joint-steering-shaft part extending in the top-bottom direction of the vehicle body frame 21. The left transfer plate 664 and the left joint 667 are rotatable relative to each other about the left-joint-steering-shaft part.

The right joint 668 is located at the right of the intermediate joint 666 in the left-right direction of the vehicle body frame 21. The right joint 668 is coupled to a front portion of the right transfer plate 665 through a right-joint-steering-shaft part extending in the top-bottom direction of the vehicle body frame. The right transfer plate 665 and the right joint 668 are rotatable relative to each other about the right-joint-steering-shaft part.

A front portion of the intermediate joint 666 is provided with an intermediate-joint-rotation-shaft part 666*a* extending in the front-rear direction of the vehicle body frame 21. A front portion of the left joint 667 is provided with a left-joint-rotation-shaft part 667*a* extending in the front-rear direction of the vehicle body frame 21. A front portion of the right joint 668 is provided with a right-joint-rotation-shaft part 668a extending in the front-rear direction of the vehicle body frame 21.

The tie rod 669 extends in the left-right direction of the vehicle body frame 21. The tie rod 669 is coupled to the intermediate joint 666, the left joint 667, and the right joint 668 through the intermediate-joint-rotation-shaft part 666a, the left-joint-rotation-shaft part 667a, and the right-joint-rotation-shaft part 668a.

In this embodiment, the tie rod 669 is made of the same material as that of the upper cross member 51, and has the same shape as that of the upper cross member 51. The shape of the tie rod may not be the same as that of the upper cross member. The tie rod may be made of a material different from that of the upper cross member. That is, the tie rod may be made of any material as long as necessary strength is obtainable, and the tie rod may also be in any shape as long as necessary strength is obtainable.

The tie rod 669 and the intermediate joint 666 are rotatable relative to each other about the intermediate-joint-rotation-shaft part 666a provided in the front portion of the intermediate joint 666. The tie rod 669 and the left joint 667 are rotatable relative to each other about the left-joint-rotation-shaft part 667a provided in the front portion of the left joint 667. The tie rod 669 and the right joint 668 are rotatable relative to each other about the right-joint-rotation-shaft part 668a provided in the front portion of the right joint 668.

The left transfer plate 664 is coupled to the intermediate transfer plate 663 through the left joint 667, the tie rod 669, and the intermediate joint 666. The right transfer plate 665 is coupled to the intermediate transfer plate 663 through the right joint 668, the tie rod 669, and the intermediate joint 666. The left transfer plate 664 and the right transfer plate 665 are coupled to each other through the left joint 667, the tie rod 669, and the right joint 668. That is, the tie rod 669 couples the intermediate transfer plate 663, the left transfer plate 664, and the right transfer plate 665.

Next, with reference to FIG. 3, a steering operation of the leaning vehicle 1 will be described.

When a driver operates the handlebar 651, the steering shaft 652 (see, for example, FIG. 2) rotates about the intermediate steering axis Z with respect to the head pipe 211. In the case of leftward steering, the steering shaft 652 rotates in the direction indicated by arrow LT. With the rotation of the steering shaft 652, the intermediate transfer plate 663 rotates about the intermediate steering axis Z in the direction indicated by arrow LT with respect to the head pipe 211.

With the rotation of the intermediate transfer plate 663 in the direction indicated by arrow LT, the intermediate joint 666 rotates in the direction indicated by arrow RT with respect to the intermediate transfer plate 663. Accordingly, the tie rod 669 moves rightward in the left-right direction of the vehicle body frame 21 and rearward in the front-rear direction of the vehicle body frame 21 while maintaining the posture thereof.

With the movement of the tie rod 669 described above, the left joint 667 and the right joint 668 rotate in the direction indicated by arrow RT with respect to the left transfer plate 664 and the right transfer plate 665, respectively. Accordingly, while the tie rod 669 maintains the posture thereof, the left transfer plate 664 and the right transfer plate 665 rotate in the direction indicated by arrow LT.

When the left transfer plate 664 rotates in the direction indicated by arrow LT, the left bracket 63, which is non-rotatable with respect to the left transfer plate 664, rotates about the left steering axis X in the direction indicated by arrow LT with respect to the left side member 53.

When the right transfer plate 665 rotates in the direction indicated by arrow LT, the right bracket 64, which is non-rotatable with respect to the right transfer plate 665, rotates about the right steering axis Y in the direction indicated by arrow LT with respect to the right side member 54.

When the left bracket 63 rotates in the direction indicated by arrow LT, the left suspension part 61 supported by the left bracket 63 rotates about the left steering axis X in the direction indicated by arrow LT with respect to the left side member 53. When the left suspension part 61 rotates in the direction indicated by arrow LT, the left front wheel 31 supported by the left suspension part 61 rotates about the left steering axis X in the direction indicated by arrow LT with respect to the left side member 53.

When the right bracket 64 rotates in the direction indicated by arrow LT, the right suspension part 62 supported by the right bracket 64 rotates about the right steering axis Y in the direction indicated by arrow LT with respect to the right side member 54. When the right suspension part 62 rotates in the direction indicated by arrow LT, the right front wheel 32 supported by the right suspension part 62 rotates about the right steering axis Y in the direction indicated by arrow LT with respect to the right side member 54.

When the driver operates the handlebar 651 for rightward steering, the components of the steering mechanism 6 described above rotate in a direction opposite to the direction in leftward steering. That is, with respect of movements of the components of the steering mechanism 6, left movement and right movement are switched between leftward steering and rightward steering. Thus, detailed description on movement of the steering mechanism 6 in rightward steering will be omitted.

Specifically, the steering-force-transfer mechanism 66 causes the left suspension part 61 to rotate about the left steering axis X in a rotation direction of the steering member 65 in accordance with rotation of the steering member 65. Similarly, the steering-force-transfer mechanism 66 causes the right suspension part 62 to rotate about the right steering axis Y in the rotation direction of the steering member 65 in accordance with rotation of the steering member 65. Accordingly, the steering-force-transfer mechanism 66 transfers a steering force to the left front wheel 31 and the right front wheel 32 in accordance with an operation of the steering member 65 by a driver. The left front wheel 31 and the right front wheel 32 rotate about the left steering axis X and the right steering axis Y, respectively, in a direction in accordance with the direction of operation of the steering member 65 by the driver.

Figure 10:
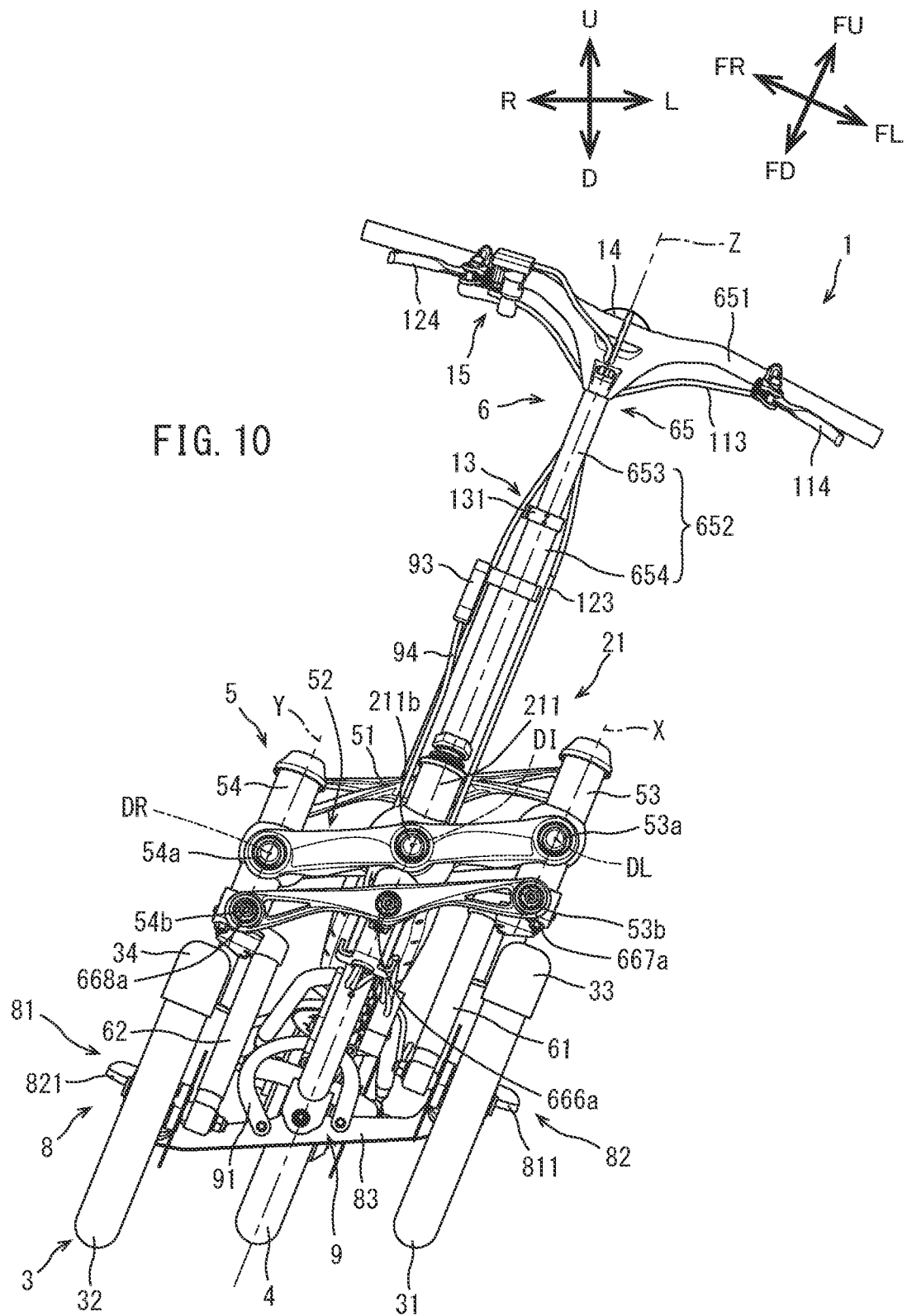
FIG. 10 is a view corresponding to FIG. 2 and illustrating a state where the leaning vehicle leans leftward.

A lean operation of the leaning vehicle 1 will now be described with reference to FIGS. 2 and 10. FIG. 10 is a front view of a front portion of the leaning vehicle 1 in a state where the vehicle body frame 21 leans leftward when seen from the front of the vehicle body frame 21.

As illustrated in FIG. 2, when the leaning vehicle 1 is seen from the front of the vehicle body frame 21 in an upright state, the linkage mechanism 5 has a rectangular shape. As illustrated in FIG. 10, when the leaning vehicle 1 is seen from the front of the vehicle body frame 21 in a lean state, the linkage mechanism 5 has a parallelogram shape. Operation of the linkage mechanism 5 and leftward or rightward leaning of the vehicle body frame 21 are interlocked to each other.

The "operation of the linkage mechanism 5" means that the shape of the linkage mechanism 5 changes. When the linkage mechanism 5 is seen from the front of the vehicle body frame 21, the change of shape of the linkage mechanism 5 is generated by rotation of the upper cross member 51 and the lower cross member 52 about the upper-intermediate-coupling axis UI and the lower-intermediate-coupling axis DI, respectively, with respect to the head pipe 211, and by rotation of the upper cross member 51, the lower cross member 52, the left side member 53, and the right side member 54 about the upper-left-coupling axis UL, the upper-right-coupling axis UR, the lower-left-coupling axis DL, and the lower-right-coupling axis DR, respectively.

For example, as illustrated in FIG. 10, when a driver causes the leaning vehicle 1 to lean leftward, the head pipe 211 leans leftward with respect to the vertical direction. When the head pipe 211 leans leftward, the upper cross member 51 rotates counterclockwise about the upper-intermediate-coupling axis UI with respect to the head pipe 211 when seen from the front of the vehicle body frame 21. Similarly, when the head pipe 211 leans leftward, the lower cross member 52 rotates counterclockwise about the lower-intermediate-coupling axis DI with respect to the head pipe 211 when seen from the front of the vehicle body frame 21. Accordingly, the upper cross member 51 moves to the left in the left-right direction of the vehicle body frame 21 with respect to the lower cross member 52.

With this movement, the upper cross member 51 rotates counterclockwise about the upper-left-coupling axis UL and the upper-right-coupling axis UR with respect to the left side member 53 and the right side member 54, respectively, when seen from the front of the vehicle body frame 21. Similarly, the lower cross member 52 rotates counterclockwise about the lower-left-coupling axis DL and the lower-right-coupling axis DR with respect to the left side member 53 and the right side member 54, respectively, when seen from the front of the vehicle body frame 21. Accordingly, the left side member 53 and the right side member 54 lean to the left of the leaning vehicle 1 with respect to the vertical direction, while maintaining a posture parallel to the head pipe 211.

At this time, the lower cross member 52 moves to the left in the left-right direction of the vehicle body frame 21 with respect to the tie rod 669. With this movement, the tie rod 669 rotates about the intermediate-joint-rotation-shaft part 666a, the left-joint-rotation-shaft part 667a, and the right joint rotation shaft part 668a with respect to the intermediate joint 666, the left joint 667, and the right joint 668, respectively. Accordingly, the tie rod 669 maintains a posture in parallel with the upper cross member 51 and the lower cross member 52.

In the left-right direction of the leaning vehicle 1, leftward leaning of the left side member 53 causes the left suspension part 61 supported by the left side member 53 to lean leftward. This leaning causes the left front wheel 31 supported by the left suspension part 61 to lean leftward while maintaining a posture parallel to the head pipe 211.

In the left-right direction of the leaning vehicle 1, leftward leaning of the right side member 54 causes the right suspension part 62 supported by the right side member 54 to lean leftward. With this leaning, the right front wheel 32 supported by the right suspension part 62 leans leftward while maintaining a posture parallel to the head pipe 211.

In the description on lean operation of the left front wheel 31 and the right front wheel 32 described above, the top-bottom direction is defined with reference to the vertical direction. However, in lean operation of the leaning vehicle 1 (in operation of the linkage mechanism 5), the top-bottom direction of the vehicle body frame 21 does not coincide with the vertical direction. When the top-bottom direction of the vehicle body frame 21 is used as a reference, in operation of the linkage mechanism 5, relative positions of the left front wheel 31 and the right front wheel 32 change in the top-bottom direction of the vehicle body frame 21. In other words, the linkage mechanism 5 causes the vehicle body frame 21 to lean to the left or right of the leaning vehicle 1 with respect to the vertical direction by changing relative positions of the left front wheel 31 and the right front wheel 32 in the top-bottom direction of the vehicle body frame 21. Accordingly, the leaning vehicle 1 turns to the left.

When the driver causes the leaning vehicle 1 to lean rightward, the components of the leaning vehicle 1 described above lean rightward. Accordingly, the leaning vehicle 1 turns to the right. With respect to movements of the components of the leaning vehicle 1, left movement and right movement are switched between leftward leaning and rightward leaning. Thus, detailed description on movement of the components of the leaning vehicle 1 in rightward leaning will be omitted.

Figure 5:
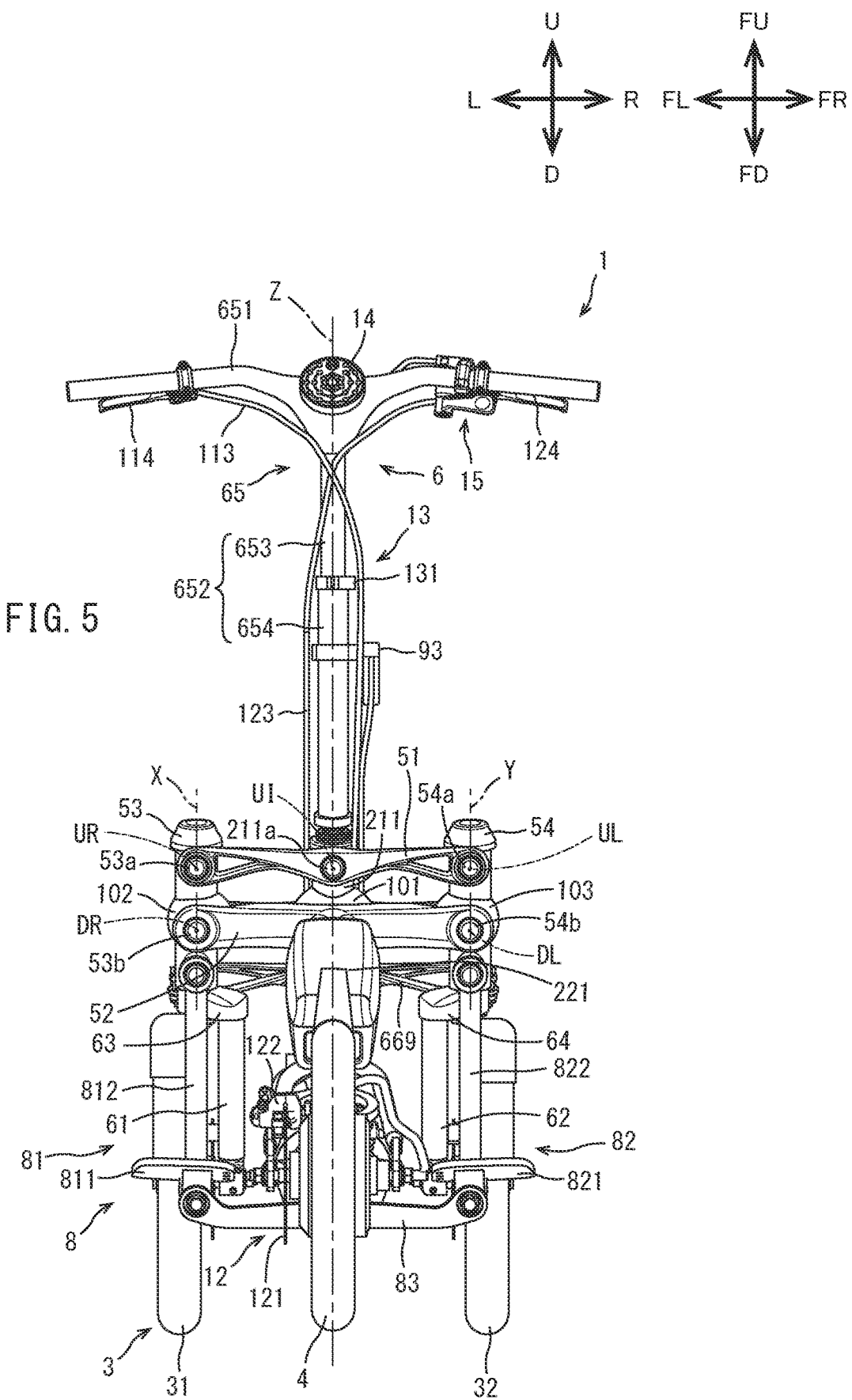
FIG. 5 is a rear view when the leaning vehicle is seen from the rear.

As illustrated in FIGS. 3 and 5, the load transfer mechanism 8 includes a left-foot-load-transfer part 81, a right-foot-load-transfer part 82, and a left-right coupling member 83.

The left-foot-load-transfer part 81 includes the left-foot-placing part 811 and the left coupling member 812.

A left foot of a standing driver is placed on the left-foot-placing part 811. The left coupling member 812 couples the left-foot-placing part 811 and the left side member 53 of the linkage mechanism 5 to each other. As illustrated in FIG. 1, the left coupling member 812 extends, from the left side member 53, rearward in the front-rear direction of the vehicle body frame 21 and downward in the top-bottom direction of the vehicle body frame 21. A rear end portion of the left coupling member 812 is connected to the left-foot-placing part 811. The left-foot-load-transfer part 81 is configured to transfer a load of the driver input through the left-foot-placing part 811, to the left side member 53.

As illustrated in FIGS. 3 and 5, the right-foot-load-transfer part 82 includes the right-foot-placing part 821 and the right coupling member 822.

A right foot of the standing driver is placed on the right-foot-placing part 821. The right coupling member 822 couples the right-foot-placing part 821 and the right side member 54 of the linkage mechanism 5 to each other. The right coupling member 822 extends, from the right side member 54, rearward in the front-rear direction of the vehicle body frame 21 and downward in the top-bottom direction of the vehicle body frame 21. A rear end portion of the right coupling member 822 is connected to the right-foot-placing part 821. The right-foot-load-transfer part 82 is configured to transfer a load of the driver input through the right-foot-placing part 821, to the right side member 54.

With the configuration described above, a load applied to the left-foot-placing part 811 through the left foot of the driver and a load applied to the right-foot-placing part 821 through the right foot of the driver are individually adjusted to thereby control leaning of the vehicle body frame 21.

Figure 11:
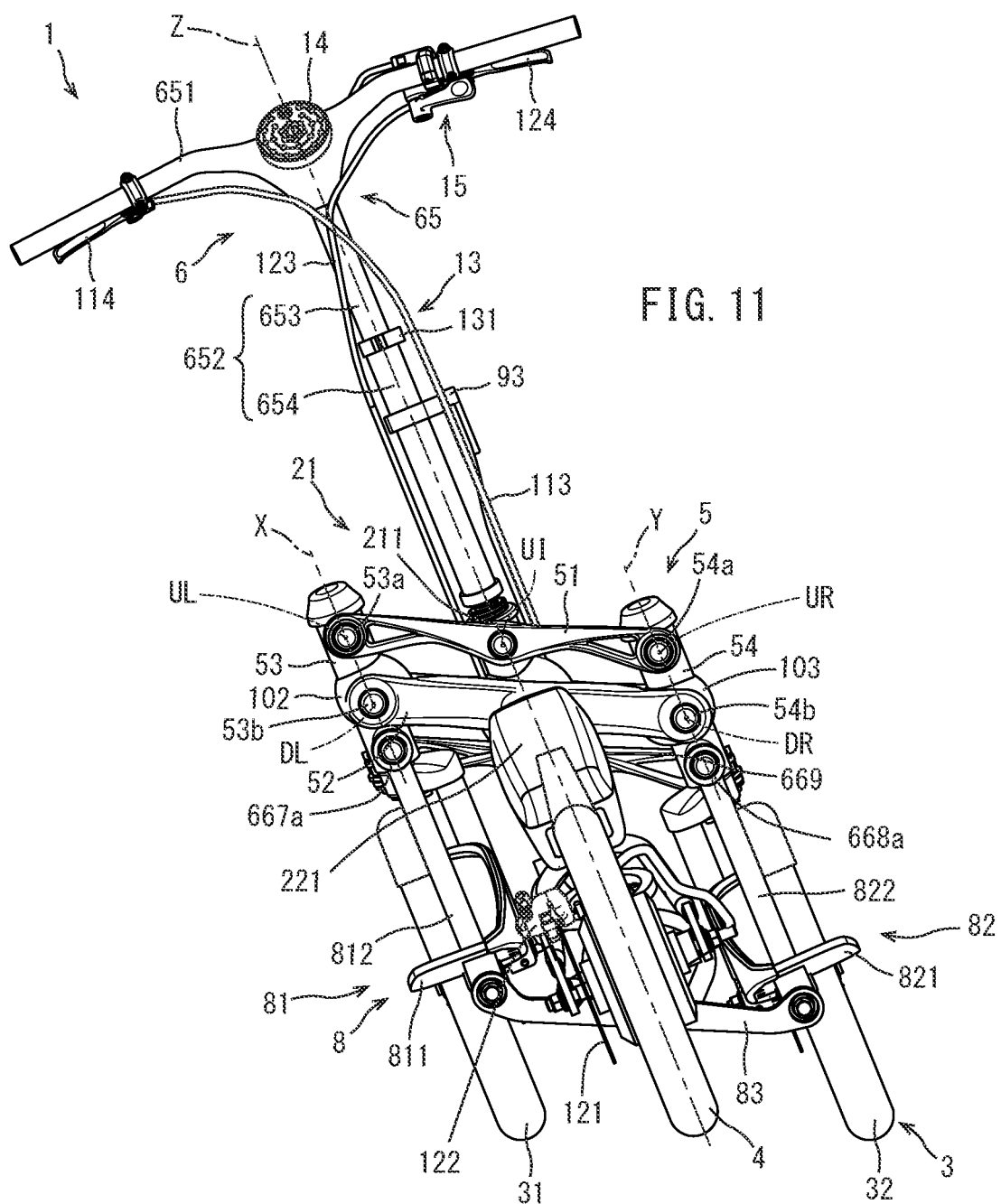
FIG. 11 is a view corresponding to FIG. 5 and illustrating a state where the leaning vehicle leans leftward.

For example, as illustrated in FIGS. 10 and 11, when the vehicle body frame 21 leans to the left of the leaning vehicle 1, the left side member 53 is located above the right side member 54 in the top-bottom direction of the vehicle body frame 21. FIG. 11 is a rear view of a front portion of the leaning vehicle 1 in a state where the vehicle body frame 21 leans leftward when seen from the rear of the vehicle body frame 21.

When a load is applied by a left foot to the left side member 53 through the left-foot-placing part 811, a force is exerted to the left side member 53 such that the left side member 53 is displaced in the downward direction of the vehicle body frame 21. Accordingly, leftward leaning of the vehicle body frame 21 can be suppressed in the left-right direction of the leaning vehicle 1.

On the other hand, when the vehicle body frame 21 leans to the right of the leaning vehicle 1, the right side member 54 is located above the left side member 53 in the top-bottom direction of the vehicle body frame 21. When a load is applied by a right foot to the right side member 54 through the right-foot-placing part 821, a force is exerted to the right side member 54 such that the right side member 54 is displaced in the downward direction of the vehicle body frame 21. Accordingly, rightward leaning of the vehicle body frame 21 can be suppressed in the left-right direction of the leaning vehicle 1.

When the vehicle body frame 21 leans leftward or rightward from the upright state, the normal direction to the placing surface of the left-foot-placing part 811 and the normal direction to the placing surface of the right-foot-placing part 821 change. However, an angle formed by the direction in which the head pipe 211 extends (the direction in which the intermediate steering axis Z extends) and the placing surface of the left-foot-placing part 811 and the placing surface of the right-foot-placing part 821 does not change. That is, the normal direction to the placing surface of the left-foot-placing part 811 and the normal direction to the placing surface of the right-foot-placing part 821 constantly coincide with the top-bottom direction of the vehicle body frame 21.

The left-right coupling member 83 couples the left-foot-placing part 811 and the right-foot-placing part 821 to each other in the left-right direction of the vehicle body frame 21 under the vehicle body frame 21. In the left-right direction of the vehicle body frame 21, a center portion of the left-right coupling member 83 is supported by a rotation support part 214c fixed to a lower portion of the under frame 214 of the vehicle body frame 21, to be rotatable about the under frame 214. Accordingly, in the top-bottom direction of the vehicle body frame 21, the left-right coupling member 83 leans in the top-bottom direction in accordance with upward or downward movement of the left-foot-placing part 811 and the right-foot-placing part 821.

In this manner, the left-foot-placing part 811 and the right-foot-placing part 821 move upward or downward in an interlocked manner in accordance with an input of a load from a left foot on the left-foot-placing part 811 or an input of a load from a right foot on the right-foot-placing part 821. Thus, with the input of a load from the left foot on the left-foot-placing part 811 or the input of a load from the right foot on the right-foot-placing part 821 described above, the load transfer mechanism 8 can easily suppress leftward or rightward leaning of the vehicle body frame 21.

(Lean Lock Mechanism)

Figure 12:
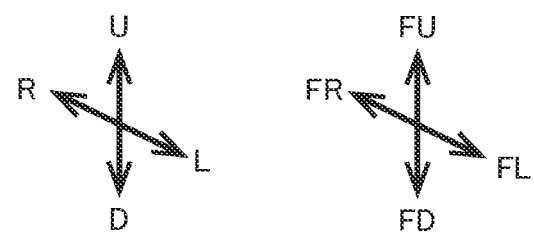
FIG. 12 is a perspective view illustrating a lean lock mechanism in an enlarged manner.
Figure 12:
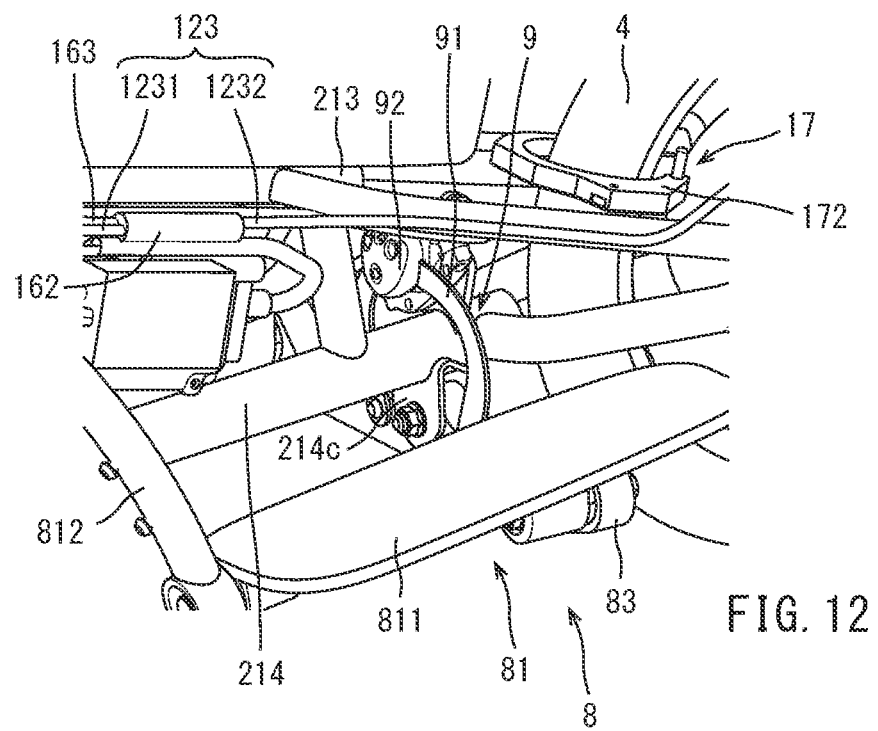

Next, the lean lock mechanism 9 will be described with reference to FIGS. 1, 2, and 12. The lean lock mechanism 9 includes the lean lock disc 91, the lean lock caliper 92, and the lean lock lever 93 (operation input section) (see FIG. 2). FIG. 12 is a perspective view illustrating the lean lock disc 91 and the lean lock caliper 92 of the lean lock mechanism 9 in an enlarged manner.

The lean lock disc 91 is displaced relative to the vehicle body frame 21. The lean lock caliper 92 is not displaced relative to the vehicle body frame 21.

As illustrated in FIGS. 2 and 12, the lean lock disc 91 is a plate member formed by partially cutting off an annular ring, and is fixed to the left-right coupling member 83 coupling the left-foot-placing part 811 and the right-foot-placing part 821 to each other. Specifically, as illustrated in FIG. 12, both end portions of the lean lock disc 91 are fixed to the left-right coupling member 83 while extending over the under frame 214 and the rotation support part 214c of the vehicle body frame 21. The rotation support part 214c is provided in the under frame 214 and rotatably supports the left-right coupling member 83. Accordingly, in a case where the left-foot-placing part 811 and the right-foot-placing part 821 are displaced relative to the vehicle body frame 21 in the top-bottom direction of the vehicle body frame 21, the lean lock disc 91 also rotates about the rotation support part 214c together with the left-right coupling member 83.

As described above, since the lean lock disc 91 is disposed in a manner to extend over the under frame 214, the height of the vehicle body frame 21 can be reduced, and the size of the vehicle body frame 21 in the left-right direction can be reduced.

The lean lock caliper 92 is fixed to the under frame 214. The lean lock caliper 92 includes a caliper sandwiching the lean lock disc 91 in the thickness direction.

The lean lock caliper 92 actuates to hold the lean lock disc 91 in the thickness direction and apply a friction force to the lean lock disc 91 by a lock operation of the lean lock lever 93 attached to the steering shaft 652. This state of the lean lock caliper 92 is a locked state of the lean lock mechanism 9.

On the other hand, the lean lock caliper 92 actuates to cancel holding of the lean lock disc 91 and eliminate or reduce the friction force to the lean lock disc 91 by an unlock operation of the lean lock lever 93. This state of the lean lock caliper 92 is an unlocked state of the lean lock mechanism 9.

The lean lock lever 93 is attached to a right portion of the steering shaft 652 in the left-right direction of the vehicle body frame 21. Accordingly, a driver can easily operate the lean lock lever 93 with the right hand while the throttle device 15 is not operated with the right hand. The lean lock lever 93 may be attached to another portion of the steering shaft 652 or the vehicle body frame 21.

An operation of the lean lock lever 93 is input to the lean lock caliper 92 through the lean lock wire 94. That is, the lean lock wire 94 connected to the lean lock lever 93 is connected to the lean lock caliper 92. An unillustrated sensor for detecting a holding state of the lean lock disc 91 is provided in at least one of the lean lock caliper 92, the lean lock lever 93, the lean lock wire 94, or the first equalizer 161. The sensor is configured to transmit a detection signal to the lean-lock-display section 146.

With the lean lock mechanism 9 having the configuration described above, leftward or rightward leaning of the vehicle body frame 21 of the leaning vehicle 1 can be restricted by operating the lean lock lever 93.

(Interlocking Mechanism)

In this embodiment, by operating the lean lock lever 93, the lean lock caliper 92 of the lean lock mechanism 9 is actuated and the rear-wheel-brake caliper 122 of the rear-wheel-braking mechanism 12 is also actuated. That is, the lean lock mechanism 9 and the rear-wheel-braking mechanism 12 can be interlocked with each other by operating the lean lock lever 93.

Figure 13:
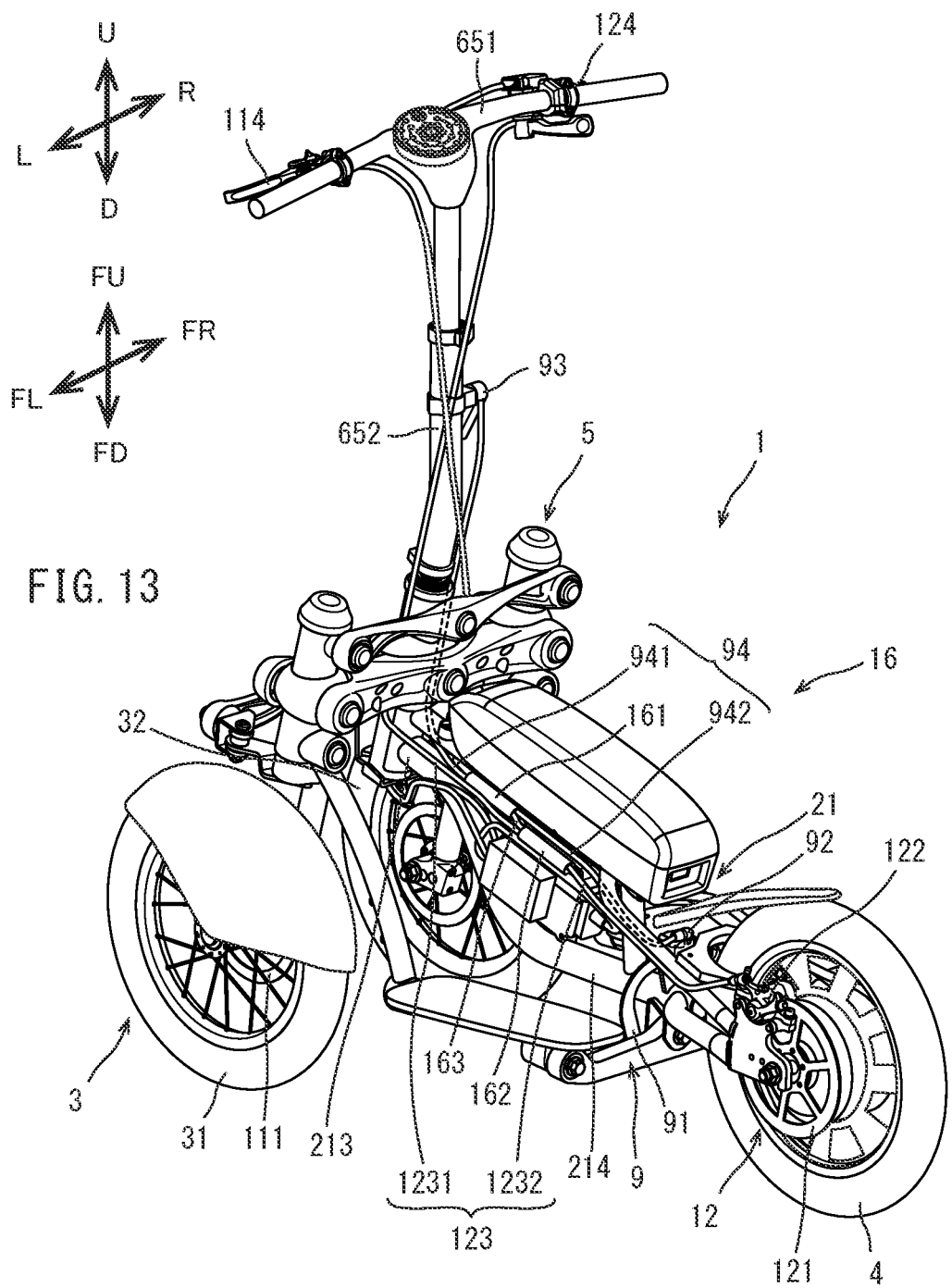
FIG. 13 is a perspective view of the leaning vehicle when seen from the rear and the left.
Figure 14:
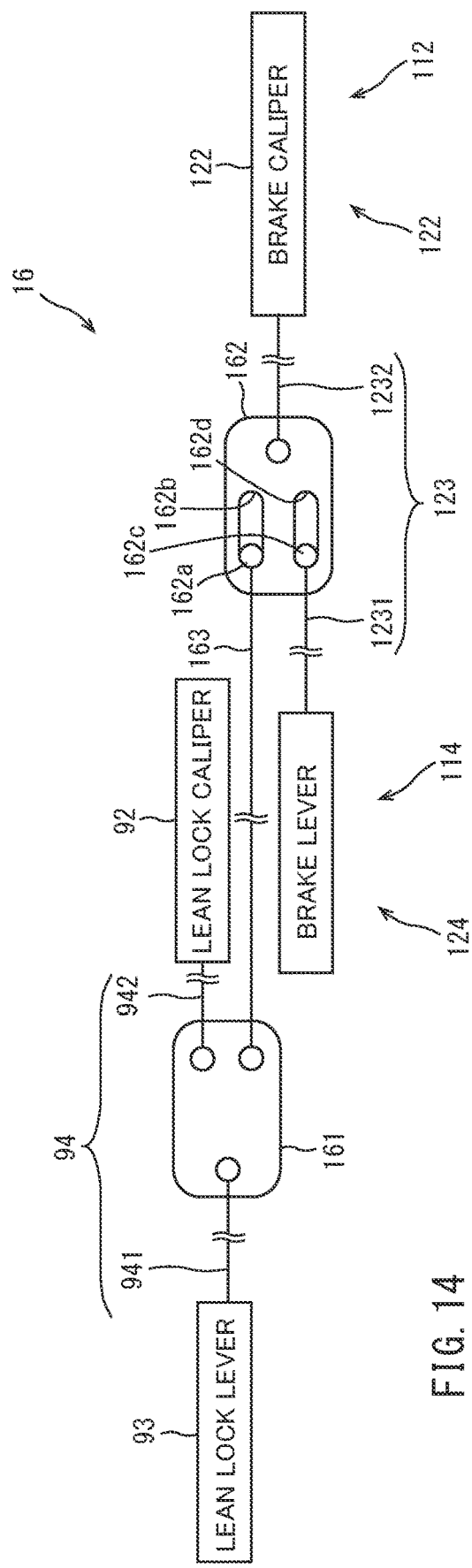
FIG. 14 is a view schematically illustrating a configuration of an interlocking mechanism.
Figure 15:
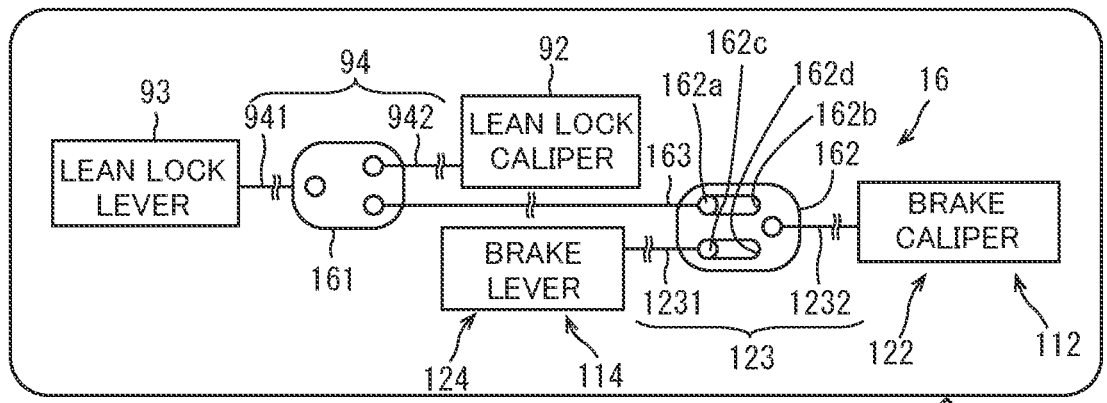
FIG. 15 shows a perspective view of the leaning vehicle seen from the rear and the left, and a view schematically illustrating a configuration of the interlocking mechanism.
Figure 15:
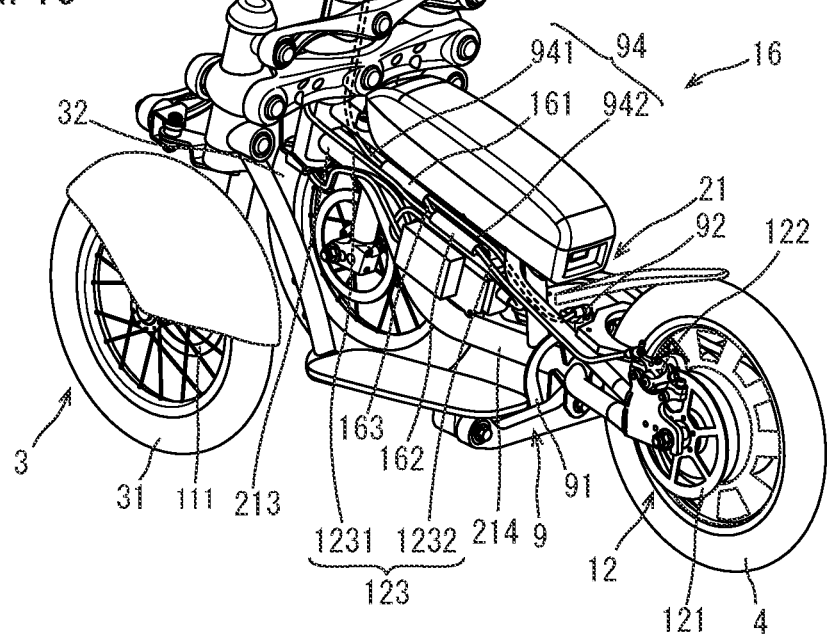

FIG. 13 is a perspective view illustrating a schematic configuration of the leaning vehicle 1 when the leaning vehicle 1 is seen from the rear and the left. FIG. 14 is a view schematically illustrating a general configuration of the interlocking mechanism 16. FIG. 14 also shows a general configuration of the interlocking mechanism 16, and the configuration illustrated in FIG. 15 is similar to the configurations illustrated in FIGS. 13 and 14. Thus, detailed description of FIG. 15 will be omitted.

The interlocking mechanism 16 includes the first equalizer 161 (operating force distributor) and a second equalizer 162 (brake actuator).

An operating force of the lean lock lever 93 is input to the first equalizer 161. The first equalizer 161 distributes and transfers the operating force input by the lean lock lever 93 to the lean lock mechanism 9 and the second equalizer 162.

The operating force distributed by the first equalizer 161 is input to the second equalizer 162, and an operating force of the rear-wheel-brake lever 124 of the rear-wheel-braking mechanism 12 is also input to the second equalizer 162. The second equalizer 162 transfers the input operating force to the rear-wheel-brake caliper 122 of the rear-wheel-braking mechanism 12 to thereby actuate rear-wheel-brake caliper 122.

The first equalizer 161 and the second equalizer 162 are fixed to the upper frame 213 of the vehicle body frame 21. The first equalizer 161 and the second equalizer 162 may be fixed to another portion of the vehicle body frame 21 such as the under frame 214.

A specific configuration of the interlocking mechanism 16 will now be described in detail with reference to FIGS. 13 and 14.

The lean lock lever 93 is connected to the lean lock caliper 92 through the lean lock wire 94 and the first equalizer 161. Specifically, the lean lock wire 94 includes a first-lean-lock wire 941 and a second-lean-lock wire 942. The first-lean-lock wire 941 connects the lean lock lever 93 and the first equalizer 161 to each other. The second-lean-lock wire 942 connects the first equalizer 161 and the lean lock caliper 92 to each other. The first equalizer 161 is located between the first-lean-lock wire 941 and the second-lean-lock wire 942. The direction in which the first-lean-lock wire 941 extends from the first equalizer 161 is opposite to the direction in which the second-lean-lock wire 942 extends from the first equalizer 161.

The state where the directions in which two wires extend are opposite to each other includes not only a case where extension lines of the two wires overlap with each other but also a case where the extension lines of the two wires intersect with each other. An angle of the intersection of the two extension lines is preferably 45 degrees or less. In the following description, the case where the directions in which two wires extend are opposite has a similar meaning to the case described above.

With the configuration described above, when the lean lock lever 93 is operated, an operating force is transferred to the lean lock caliper 92 through the first-lean-lock wire 941, the first equalizer 161, and the second-lean-lock wire 942.

The interlock brake wire 163 is connected to the first equalizer 161 such that the interlock brake wire 163 extends from the first equalizer 161 in the same direction as the direction in which the second-lean-lock wire 942 extends from the first equalizer 161. That is, the direction in which the interlock brake wire 163 extends from the first equalizer 161 is opposite to the direction in which the first-lean-lock wire 941 extends from the first equalizer 161. The interlock brake wire 163 connects the first equalizer 161 and a first connection part 162a of the second equalizer 162 to each other.

The state where the directions in which two wires extend are the same includes not only a case where the two wires are parallel to each other but also a case where the two wires intersect with each other. The case where the two wires are parallel includes a case where one wire tilts with respect to the other wire.

Accordingly, an operating force generated when the lean lock lever 93 is operated is transferred to the second equalizer 162 through the first-lean-lock wire 941, the first equalizer 161, and the interlock brake wire 163.

As described above, the first equalizer 161 functions as an operating force distributor configured to distribute an operating force generated when the lean lock lever 93 is operated to the lean lock caliper 92 and the second equalizer 162.

Although not specifically shown, the first equalizer 161 may include a spring that is compressed when a tensile force is generated in the first-lean-lock wire 941 by operation of the lean lock lever 93 and generates an elastic restoring force to be applied to the second-lean-lock wire 942 and the interlock brake wire 163 while no tensile force is generated in the first-lean-lock wire 941 by operation of the lean lock lever 93. As a result, while no tensile force is generated in the lean lock wire 94 by operation of the lean lock lever 93, the second-lean-lock wire 942 and the interlock brake wire 163 can be more reliably positioned at positions when no operating force is applied. The spring may be provided in the lean lock caliper 92.

The second equalizer 162 has a first elongated hole 162b in which the first connection part 162a connected to the interlock brake wire 163 is located and a second elongated hole 162d in which a second connection part 162c connected to a first-rear-wheel-brake wire 1231 described later is located. The longitudinal direction of the first elongated hole 162b and the longitudinal direction of the second elongated hole 162d are the same direction. The expression "the same direction" includes not only a case where the longitudinal direction of the first elongated hole 162b is parallel to the longitudinal direction of the second elongated hole 162d but also a case where the longitudinal direction of the first elongated hole 162b intersects with the longitudinal direction of the second elongated hole 162d.

The first elongated hole 162b is a hole elongated in the direction in which the interlock brake wire 163 extends from the second equalizer 162. That is, the first connection part 162a is movable in the first elongated hole 162b in the direction in which the interlock brake wire 163 extends from the second equalizer 162.

Thus, in a case where the interlock brake wire 163 is pulled with respect to the second equalizer 162, a force is transferred to the second equalizer 162 through the interlock brake wire 163 and the first connection part 162a. On the other hand, in a case where the second equalizer 162 is pulled by the first-rear-wheel-brake wire 1231 described later, the first connection part 162a moves in the first elongated hole 162b. Thus, no force is transferred to the interlock brake wire 163.

The second elongated hole 162d is a hole elongated in the direction in which the first-rear-wheel-brake wire 1231 extends from the second equalizer 162. The second connection part 162c is movable in the second elongated hole 162d in the direction in which the first-rear-wheel-brake wire 1231 extends from the second equalizer 162.

Thus, in a case where the first-rear-wheel-brake wire 1231 is pulled with respect to the second equalizer 162, a force is transferred to the second equalizer 162 through the first-rear-wheel-brake wire 1231 and the second connection part 162c. On the other hand, in a case where the second equalizer 162 is pulled by the interlock brake wire 163, the second connection part 162c moves in the second elongated hole 162d. Thus, slack in the first-rear-wheel-brake wire 1231 can be prevented.

The rear-wheel-brake lever 124 is connected to the rear-wheel-brake caliper 122 through the rear-wheel-brake wire 123 and the second equalizer 162. The rear-wheel-brake wire 123 includes the first-rear-wheel-brake wire 1231 and a second-rear-wheel-brake wire 1232. The first-rear-wheel-brake wire 1231 of the rear-wheel-brake wire 123 is connected to the second equalizer 162 in parallel with the interlock brake wire 163. The first-rear-wheel-brake wire 1231 connects the second equalizer 162 and the rear-wheel-brake lever 124 to each other. The second-rear-wheel-brake wire 1232 connects the second equalizer 162 and the rear-wheel-brake caliper 122 to each other. The direction in which the second-rear-wheel-brake wire 1232 extends from the second equalizer 162 is opposite to the direction in which the interlock brake wire 163 and the first-rear-wheel-brake wire 1231 extend from the second equalizer 162.

Accordingly, an operating force generated when the rear-wheel-brake lever 124 is operated is transferred to the rear-wheel-brake caliper 122 through the first-rear-wheel-brake wire 1231, the second equalizer 162, and the second-rear-wheel-brake wire 1232. At this time, the first connection part 162a to which the interlock brake wire 163 is connected moves in the first elongated hole 162b of the second equalizer 162. Thus, no force is transferred to the interlock brake wire 163.

An operating force generated when the lean lock lever 93 is operated is transferred to the rear-wheel-brake caliper 122 through the first-lean-lock wire 941, the first equalizer 161, the interlock brake wire 163, the second equalizer 162, and the second-rear-wheel-brake wire 1232.

As described above, the second equalizer 162 functions as a brake actuator that transfers an operating force generated when the rear-wheel-brake lever 124 is operated and an operating force generated when the lean lock lever 93 is operated to the rear-wheel-brake caliper 122 through the second-rear-wheel-brake wire 1232 and actuates the rear-wheel-brake caliper 122.

Although not specifically shown, the second equalizer 162 may include a spring that is compressed when a tensile force is generated in the first-rear-wheel-brake wire 1231 by operation of the rear-wheel-brake lever 124 and a tensile force is generated in the lean lock wire 94 by operation of the lean lock lever 93 and generates an elastic restoring force to be applied to the second-rear-wheel-brake wire 1232 while no tensile force is generated in the first-rear-wheel-brake wire 1231 by operation of the rear-wheel-brake lever 124 and no tensile force is generated in the lean lock wire 94 by operation of the lean lock lever 93. As a result, while no tensile force is generated in the first-rear-wheel-brake wire 1231 by operation of the rear-wheel-brake lever 124 and no tensile force is generated in the interlock brake wire 163 by operation of the lean lock lever 93, the second-rear-wheel-brake wire 1232 can be more reliably positioned at positions when no operating force is applied. The spring may be provided in the rear-wheel-brake caliper 122.

With the configuration described above, the interlocking mechanism 16 can interlock the lean lock caliper 92 of the lean lock mechanism 9 and the rear-wheel-brake caliper 122 of the rear-wheel-braking mechanism 12 with each other by operation of the lean lock lever 93.

By actuating the rear-wheel-braking mechanism 12 and the lean lock mechanism 9 by operation of the lean lock lever 93 as described above, the leaning vehicle 1 can easily actuate the rear-wheel-braking mechanism 12 and the lean lock mechanism 9 by one operation.

In this manner, a driver can easily get on or off the leaning vehicle 1 with leftward and rightward leaning and forward and rearward movement of the leaning vehicle 1 restricted.

Thus, even in a case where a driver gets on or off the leaning vehicle from the left of the vehicle body frame 21 in an inclined place or a case where the driver gets on or off the leaning vehicle from the right of vehicle body frame 21 in an inclined place, the driver can easily get on or off the leaning vehicle.

In the configuration of this embodiment, only the rear-wheel-braking mechanism 12 can be actuated by operation of the rear-wheel-brake lever 124. Accordingly, it is possible to prevent actuation of the lean lock mechanism 9 by operation of the rear-wheel-brake lever 124. This makes it possible to prevent the lean lock mechanism 9 from coming to be in a locked state or an unlocked state by operation of the rear-wheel-brake lever 124.

In the configuration described above, the lean lock mechanism 9, the front-wheel-braking mechanism 11, the rear-wheel-braking mechanism 12, and the interlocking mechanism 16 have mechanical configurations that transfer operating forces with, for example, wires. Thus, it is unnecessary to provide an electric actuator for driving the mechanisms, for example. As a result, a margin is generated in a space in the vehicle body frame 21 and the weight of the leaning vehicle 1 can be reduced. In addition, even while the battery is in a discharge state, the lean lock mechanism 9, the front-wheel-braking mechanism 11, and the rear-wheel-braking mechanism 12 can be manually actuated.

Other Embodiments

The embodiment of the present teaching has been described above, but the embodiment is merely an example for carrying out the present teaching. Thus, the present teaching is not limited to the embodiment described above, and the embodiment may be modified as necessary within a range not departing from the gist of the present teaching.

In the embodiment, the lean lock mechanism 9 includes the lean lock caliper 92 that holds the platy lean lock disc 91 in the thickness direction and applies a friction force to the lean lock disc 91. Alternatively, the lean lock mechanism may have any configuration as long as leftward or rightward leaning of the leaning vehicle can be restricted. In the embodiment, the lean lock mechanism 9 is actuated by the lean lock wire 94, but may be actuated with transfer elements (e.g., hydraulic pressure) other than wires.

In the embodiment, the front-wheel-braking mechanism 11 includes the front-wheel-brake discs 111 and the front-wheel-brake calipers 112. Alternatively, the front-wheel-braking mechanism may have any configuration as long as a braking force is applied to the pair of left and right front wheels. In the embodiment, the front-wheel-braking mechanism 11 is actuated by a hydraulic pressure, but may be actuated by other techniques (e.g., wires) other than the hydraulic pressure.

In the embodiment, the rear-wheel-braking mechanism 12 includes the rear-wheel-brake disc 121 and the rear-wheel-brake caliper 122. Alternatively, the rear-wheel-braking mechanism may have any configuration as long as a braking force is applied to the rear wheel. In the embodiment, the rear-wheel-braking mechanism 12 is actuated by the rear-wheel-brake wire 123, but may be actuated by other techniques (e.g., hydraulic pressure) other than wires.

In the embodiment, the leaning vehicle 1 includes the interlocking mechanism 16 that interlocks the lean lock mechanism 9 and the rear-wheel-braking mechanism 12 with each other by operating the lean lock lever 93. Alternatively, the interlocking mechanism may interlock the lean lock mechanism and the front-wheel-braking mechanism with each other. The interlocking mechanism may interlock the lean lock mechanism, the front-wheel-braking mechanism, and the rear-wheel-braking mechanism with one another.

In the embodiment, the interlocking mechanism 16 includes the first equalizer 161 and the second equalizer 162. Alternatively, the interlocking mechanism may have any configuration as long as the lean lock mechanism and the braking mechanism can be interlocked with each other by operation of the lean lock lever.

In the embodiment, the leaning vehicle 1 includes the left-foot-placing part 811 coupled to the left side member 53 of the linkage mechanism 5 and the right-foot-placing part 821 coupled to the right side member 54 of the linkage mechanism 5. Alternatively, the left-foot-placing part may be coupled to the right side member. The right-foot-placing part may be coupled to the left side member. The leaning vehicle does not need to include the left-foot-placing part and the right-foot-placing part connected to the linkage mechanism. The leaning vehicle does not need to include the left-foot-placing part and the right-foot-placing part.

In the embodiment, the first spacer 101, the second spacer 102, and the third spacer 103 are spherical. Alternatively, at least one of the first spacer, the second spacer, or the third spacer may have another shape such as a columnar shape or a conic shape.

The leaning vehicle may include at least one of the first spacer, the second spacer, or the third spacer or may include none of the first spacer, the second spacer, and the third spacer.

In the embodiment, the linkage mechanism 5 includes the upper cross member 51 located at the rear of the head pipe 211. Alternatively, the linkage mechanism may include a front-upper-cross member at the front of a rear-upper-cross member and the head pipe.

In the embodiment, the linkage mechanism 5 includes the upper cross member 51 and the lower cross member 52 whose intermediate portions in the left-right direction of the vehicle body frame 21 are rotatably supported by the head pipe 211. Alternatively, the upper cross member may include a left-upper-cross member whose right end portion is rotatably supported by the head pipe and a right-upper-cross member whose left end portion is rotatably supported by the head pipe. At least one of the front lower cross member or the rear lower cross member in the lower cross member may include a left-lower-cross member whose right end portion is rotatably supported by the head pipe and a right-lower-cross member whose left end portion is rotatably supported by the head pipe. The linkage mechanism may be a linkage mechanism of a left and right independent suspension type.

Specifically, the linkage mechanism may include a left arm portion located at the left of the head pipe in the left-right direction of the vehicle body frame when the vehicle body frame is seen from the front and rotatably supported by the head pipe, and a right arm portion located at the right of the head pipe in the left-right direction of the vehicle body frame when the vehicle body frame is seen from the front and rotatably supported by the head pipe. A left side member is rotatably connected to the left arm portion and a right side member is rotatably connected to the right arm portion.

INDUSTRIAL APPLICABILITY

The present teaching is applicable to leaning vehicles.

DESCRIPTION OF REFERENCE CHARACTERS

1 leaning vehicle
2 vehicle body
3 front wheel
4 rear wheel
linkage mechanism
6 steering mechanism
8 load transfer mechanism
9 lean lock mechanism
11 front-wheel-braking mechanism
12 rear-wheel-braking mechanism (braking mechanism)
13 extension/contraction adjusting mechanism
14 meter
throttle device
16 interlocking mechanism
17 lock mechanism
21 vehicle body frame
22 power unit
31 left front wheel
32 right front wheel
41 wheel shaft
51 upper cross member
52 lower cross member
52*a* through hole
52*b* left notch
52*c* right notch
52*d*, 52*e*, 52*f* wall surface
53 left side member
53*a* upper-left-coupling part
53*b* lower-left-coupling part
54 right side member
54*a* upper-right-coupling part
54*b* lower-right-coupling part
61 left suspension part
62 right suspension part
63 left bracket
64 right bracket
65 steering member
66 steering-force-transfer mechanism
81 left-foot-load-transfer part
82 right-foot-load-transfer part
83 left-right coupling member
91 lean lock disc
92 lean lock caliper
93 lean lock lever (operation input section)
94 lean lock wire
101 first spacer
102 second spacer
103 third spacer
124 rear-wheel-brake lever (brake-operation-input section)
131 fixing member
141 body
141*a* display surface
142 power-supply-operation section
143 vehicle-state-display section
144 battery-remaining-capacity-display section
145 vehicle-speed-display section
146 lean-lock-display section
149 signal line
149*a* curl cord
151 throttle lever 151a pressing part
152 throttle-lever-support part
159 signal line
161 first equalizer (operating force distributor)
162 second equalizer (brake actuator)
162a first connection part
162b first elongated hole
162c second connection part
162d second elongated hole
163 interlock brake wire
211 head pipe
212 main frame
213 upper frame
214 under frame
221 battery
521 front-lower-cross part (front cross part)
522 rear-lower-cross part (rear cross part)
523 lower-cross-coupling part
524 lower-cross-coupling part
651 handlebar
652 steering shaft
653 inner pipe
654 outer pipe
669 tie rod
811 left-foot-placing part
812 left coupling member
821 right-foot-placing part
822 right coupling member
941 first-lean-lock wire
942 second-lean-lock wire
X left steering axis
Y right steering axis
Z intermediate steering axis
UI upper-intermediate-coupling axis
UL upper-left-coupling axis
UR upper-right-coupling axis
DI lower-intermediate-coupling axis (intermediate axis)
DL lower-left-coupling axis (left axis)
DR lower-right-coupling axis (right axis)
P rotation axis

The invention claimed is:

1. A leaning vehicle configured to lean leftward when turning left and lean rightward when turning right, the leaning vehicle comprising:
a vehicle body frame;
a left front wheel disposed left of the vehicle body frame in a left-right direction of the vehicle body frame;
a right front wheel disposed right of the vehicle body frame in the left-right direction of the vehicle body frame;
a rear wheel disposed behind the left front wheel and the right front wheel in a front-rear direction of the vehicle body frame;
a braking mechanism configured to apply a braking force to at least one of the left front wheel, the right front wheel, or the rear wheel;
a linkage mechanism supported by the vehicle body frame, the linkage mechanism being configured to change a relative position of the left front wheel and a relative position of the right front wheel, in a top-bottom direction of the vehicle body frame, with respect to the vehicle body frame, to thereby cause the vehicle body frame to lean leftward or rightward in the left-right direction of the vehicle body frame;
a lean lock mechanism configured to restrict leftward leaning and rightward leaning of the vehicle body frame; and
an interlocking mechanism configured to actuate the braking mechanism and the lean lock mechanism, wherein
the interlocking mechanism includes
an operation input section configured to input a first operating force,
a brake-operation-input section configured to input a second operating force,
an operating force distributor configured to distribute the first operating force input by the operation input section to the lean lock mechanism and the braking mechanism, and
a brake actuator configured to receive the first operating force distributed by the operating force distributor and the second operating force input via the brake-operation-input section, to transfer to the received first operating force or the received second operating force to the braking mechanism, to thereby actuate the braking mechanism to apply the braking force.

2. The leaning vehicle according to claim 1, further comprising:
a left-foot-placing part located between the left front wheel and the rear wheel, for a left foot of a driver riding on the leaning vehicle to be placed thereon;
a right-foot-placing part located between the right front wheel and the rear wheel, for a right foot of the driver to be placed thereon;
a left suspension part having an upper portion and a lower portion, the lower portion thereof supporting the left front wheel; and
a right suspension part having an upper portion and a lower portion, the lower portion thereof supporting the right front wheel, wherein
the linkage mechanism includes
a left side member coupled to the upper portion of the left suspension part, such that the upper portion of the left suspension part is rotatable about a left steering axis, the left steering axis extending in the top-bottom direction of the vehicle body frame,
a right side member coupled to the upper portion of the right suspension part, such that the upper portion of the right suspension part is rotatable about a right steering axis, the right steering axis being parallel to the left steering axis, and
a lower cross member, having
a front cross part located, in the front-rear direction of the vehicle body frame, in front of the vehicle body frame, the left side member, and the right side member, the front cross part having a left end portion, a right end portion and an intermediate portion, and
a rear cross part located, in the front-rear direction of the vehicle body frame, behind the vehicle body frame, the left side member, and the right side member, the rear cross part having a left end portion, a right end portion and an intermediate portion, wherein
the left side member is coupled to the left end portion of the front cross part and the left end portion of the rear cross part, such that the left side member is rotatable about a left axis extending in the front-rear direction of the vehicle body frame,
the right side member is coupled to the right end portion of the front cross part and the right end portion of the rear cross part, such that the right side member is rotatable about a right axis parallel to the left axis, and the intermediate portions of the front cross part and of the rear cross part are supported by the vehicle body frame, such that the intermediate portions are rotatable about an intermediate axis parallel to the left axis and the right axis, the left-foot-placing part is connected to the left side member of the linkage mechanism, the right-foot-placing part is connected to the right side member of the linkage mechanism, and the lean lock mechanism restricts movement of the left-foot-placing part and the right-foot-placing part with respect to the vehicle body frame.

3. The leaning vehicle according to claim 1, wherein the braking mechanism applies the braking force to the rear wheel.

4. The leaning vehicle according to claim 1, wherein the braking mechanism includes a front-wheel-braking mechanism configured to apply the braking force, by using a hydraulic pressure, to at least one of the left front wheel or the right front wheel.

5. The leaning vehicle according to claim 1, wherein the lean lock mechanism includes
- a lean lock disc configured to be movable with respect to the vehicle body frame, and
- a lean lock caliper provided in the vehicle body frame and configured to apply a friction force to the lean lock disc in a thickness direction when the lean lock mechanism is actuated, and the interlocking mechanism actuates the lean lock caliper by an operation input of the operation input section.

* * * * *